United States Patent [19]
Beard et al.

[11] Patent Number: 5,451,942
[45] Date of Patent: Sep. 19, 1995

[54] METHOD AND APPARATUS FOR MULTIPLEXED ENCODING OF DIGITAL AUDIO INFORMATION ONTO A DIGITAL AUDIO STORAGE MEDIUM

[75] Inventors: Terry D. Beard, Westlake Village; James S. Ketcham, Woodland Hills, both of Calif.

[73] Assignee: Digital Theater Systems, L.P., Westlake Village, Calif.

[21] Appl. No.: 192,277

[22] Filed: Feb. 4, 1994

[51] Int. Cl.$^6$ .............................................. H03M 7/00
[52] U.S. Cl. ......................................... 341/50; 341/61
[58] Field of Search ...................... 341/50, 51, 61, 141; 360/13, 15, 8, 74.1

[56] References Cited

U.S. PATENT DOCUMENTS 4,066,844  1/1978  Ridings et al. .......................... 360/15
5,325,238  6/1994  Stebbings et al. ...................... 360/15

OTHER PUBLICATIONS

"LD-ROM Supports Compressed Audio as well as CD-Digital Audio", Pioneer's LD-ROM System: Technical Overview, TP118, v. 1.10 dated May 1992, pp. 1-7.
"Digital Audio Interface Receiver" Digital Audio Products Data Book, Crystal Semiconductor Corporation, Jan., 1994, pp. 6-35- to 6-68.

*Primary Examiner*—Brian K. Young
*Attorney, Agent, or Firm*—Koppel & Jacobs

[57] ABSTRACT

Extra high quality or ultralong digital audio channels with an aggregate data bit rate that exceeds the maximum data bit rate for a digital storage medium, such as a CD, laser disk or digital audio tape, are recorded on the audio medium. The recording is accomplished by compressing the data bit rates of the multi-channel input signals so that their aggregate data bit rate after compression does not exceed the maximum for the storage medium, multiplexing the compressed audio signals, encoding the multiplexed signal into a predetermined format, and recording the encoded signal on the storage medium. With the storage medium configured to store audio samples having a predetermined number of bits per sample, the compressed audio signals are multiplexed into data groups having the same number of bits, thereby emulating a normal input to the storage medium, even when this involves dividing various input samples among different data groups. The recorded signals can thus be placed in a standard AES/EBU format normally expected by the storage medium. Playback is achieved by decoding, demultiplexing and decompressing the signals from the storage medium in a manner complementary to the recording process.

25 Claims, 22 Drawing Sheets

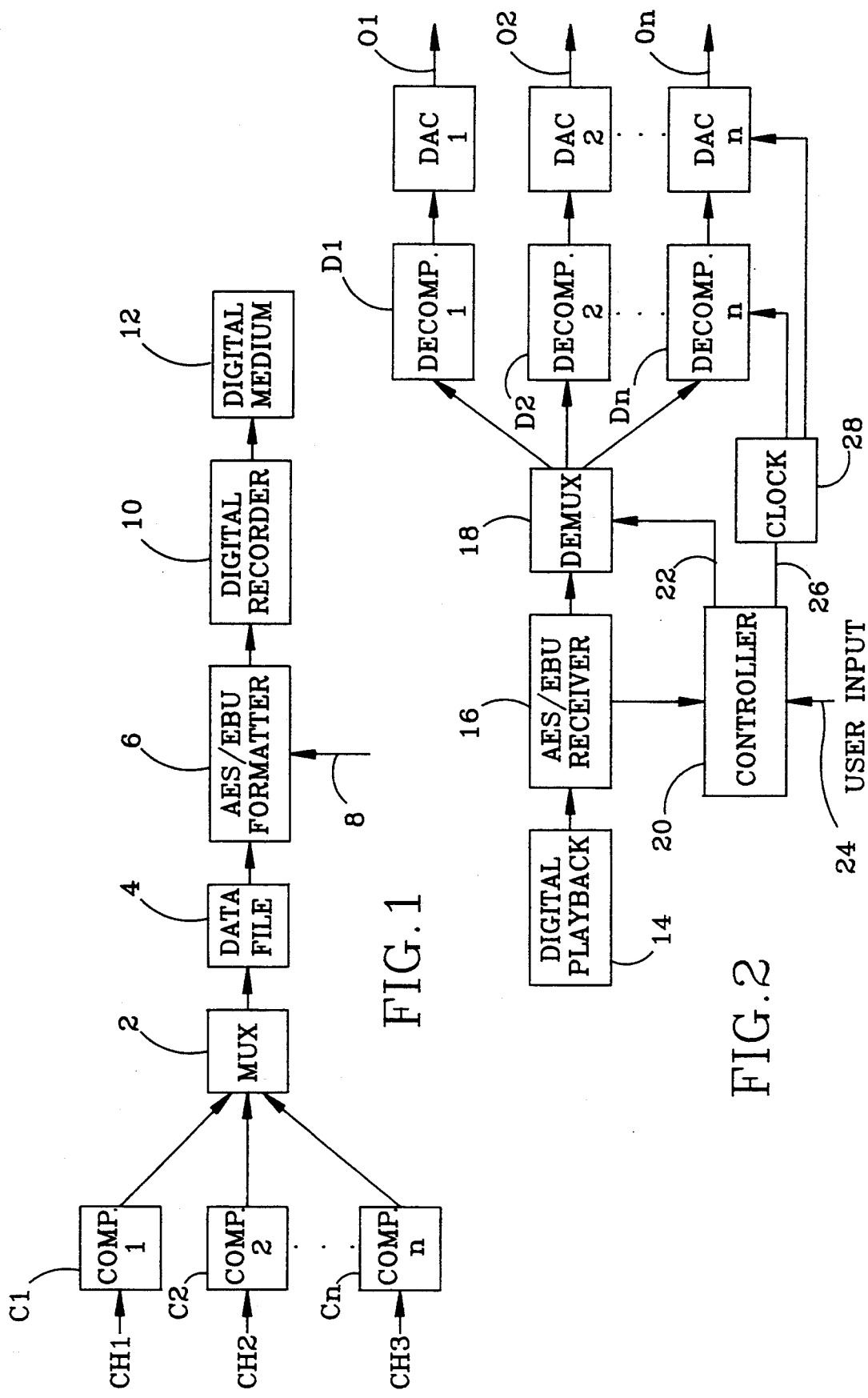

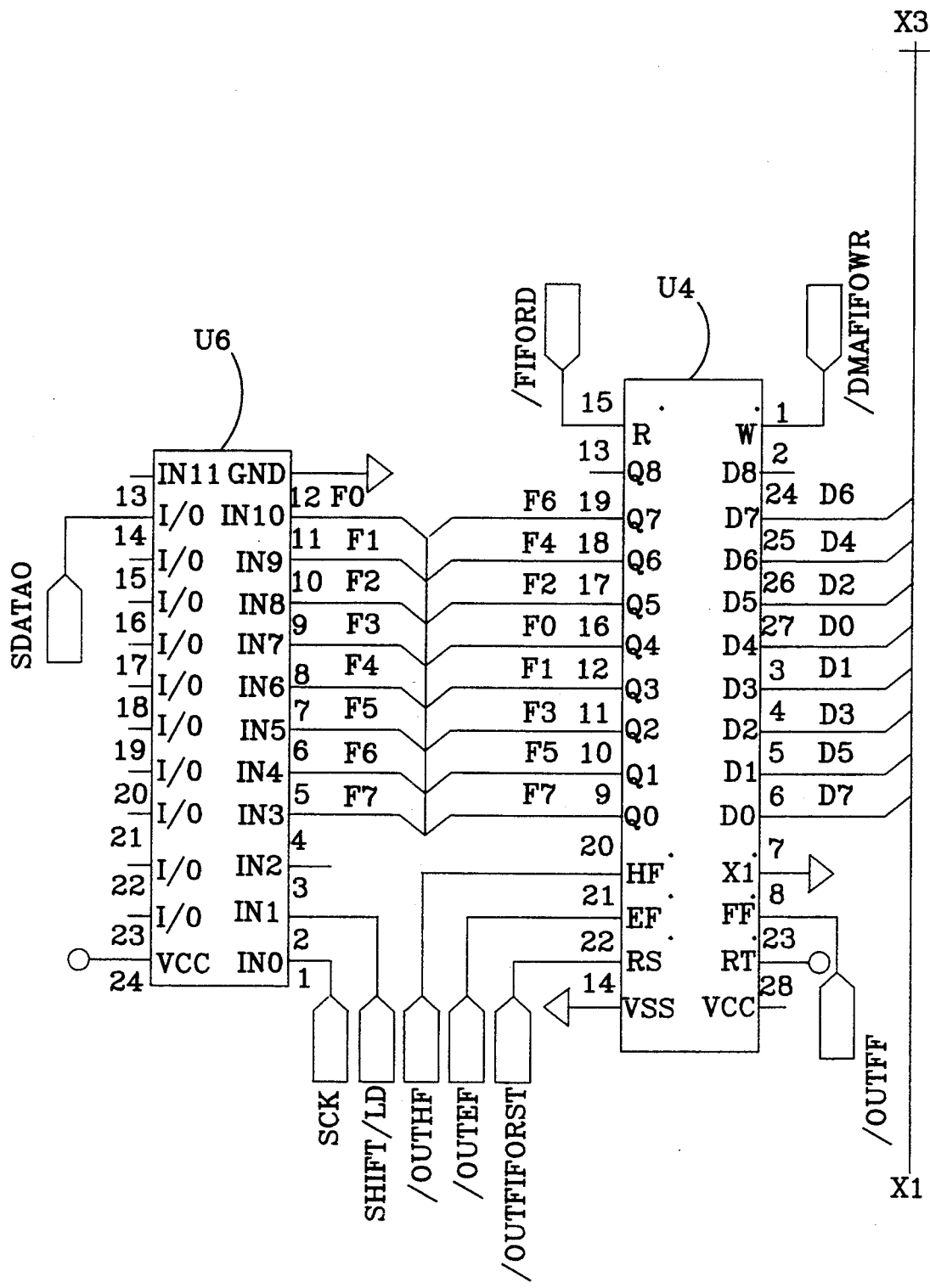
FIG.6A1

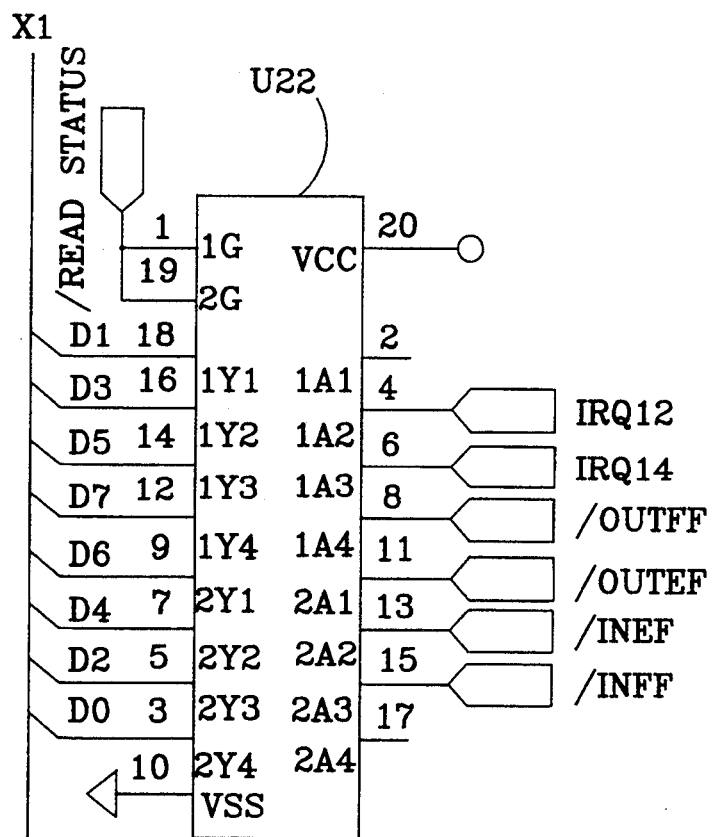
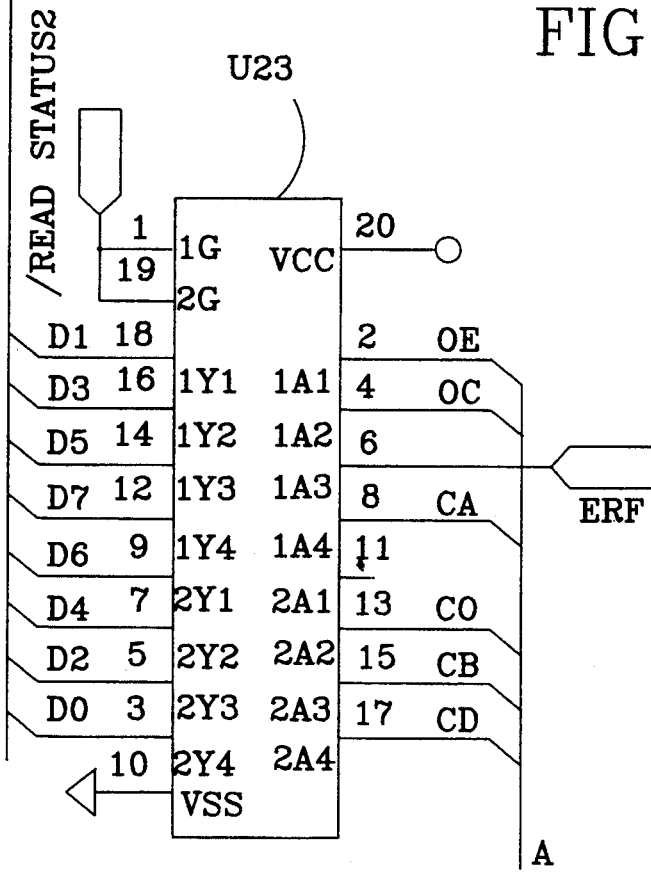
FIG. 6A2

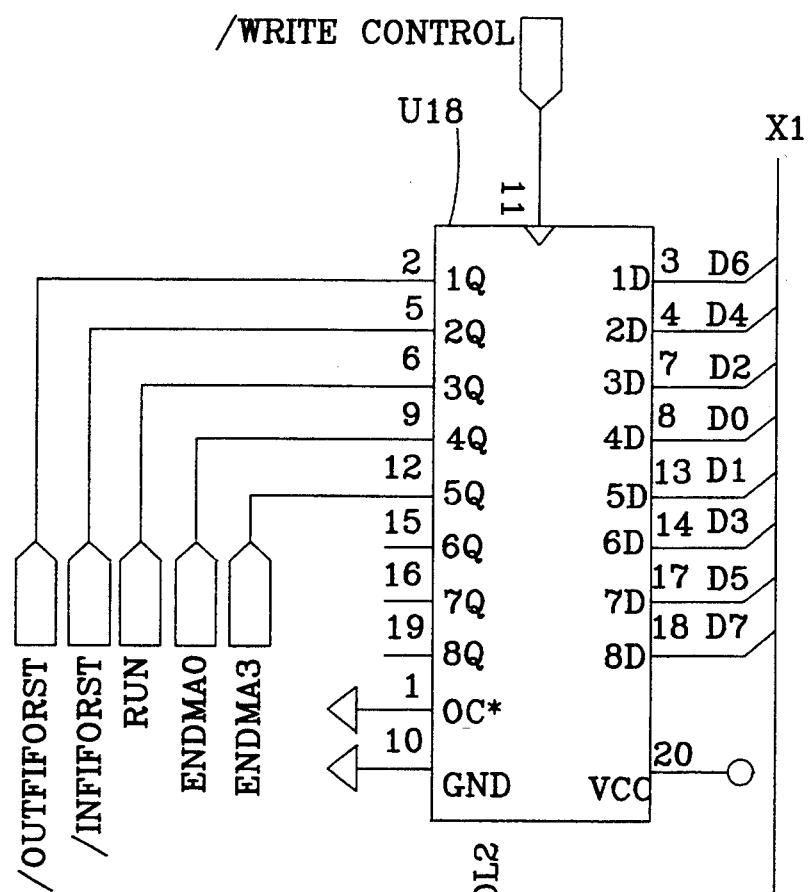
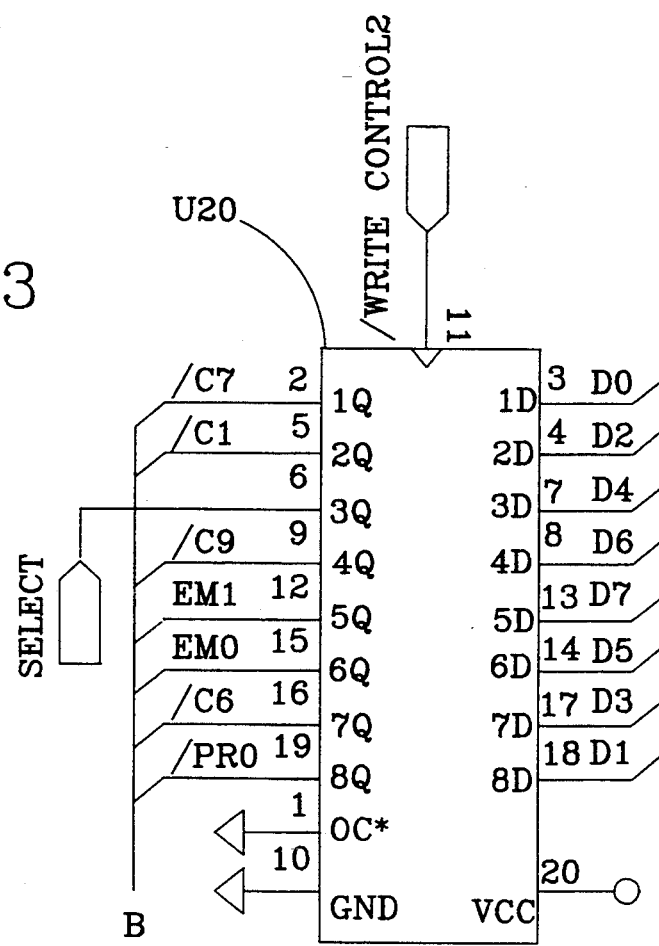
FIG.6A3

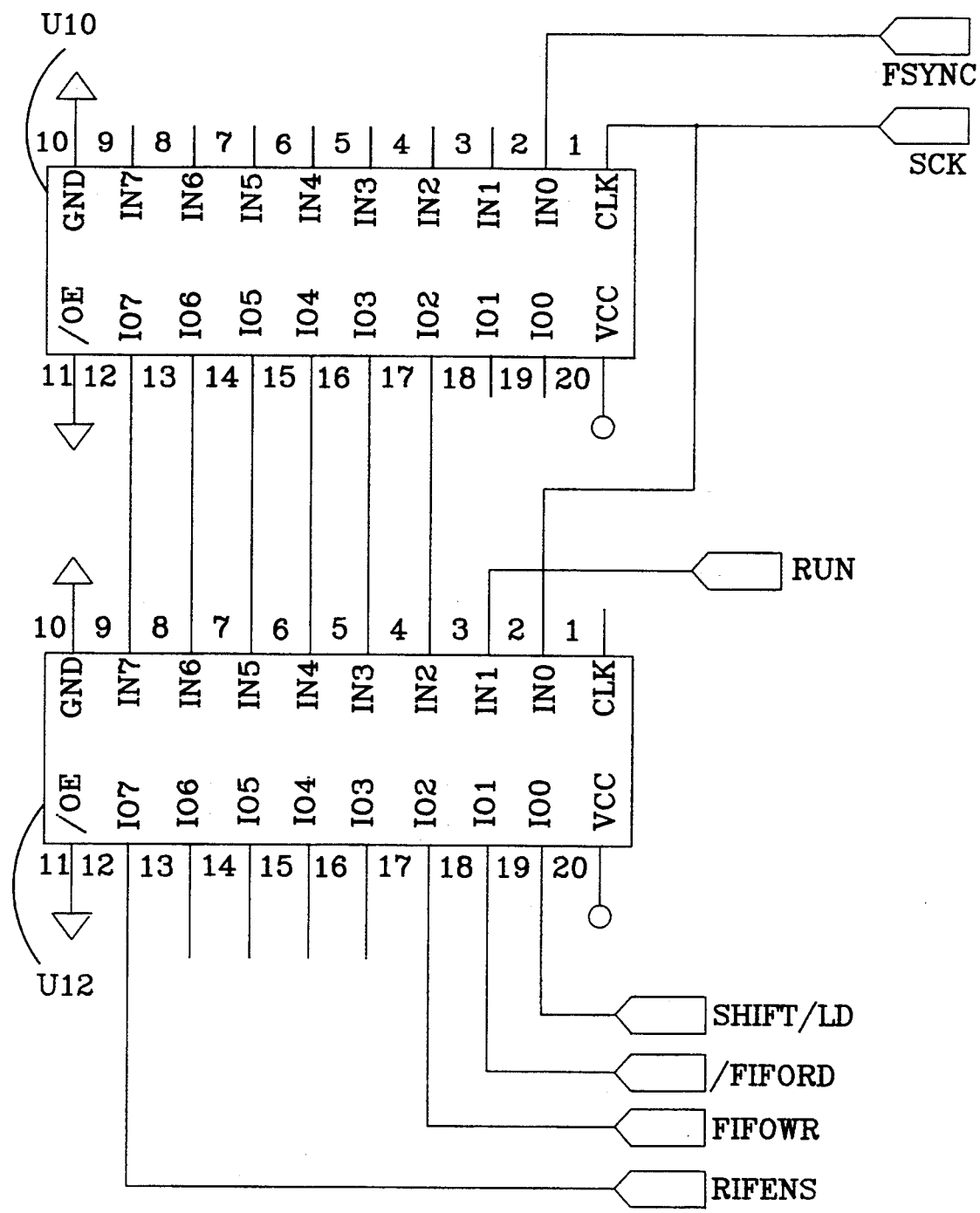
FIG.6A4

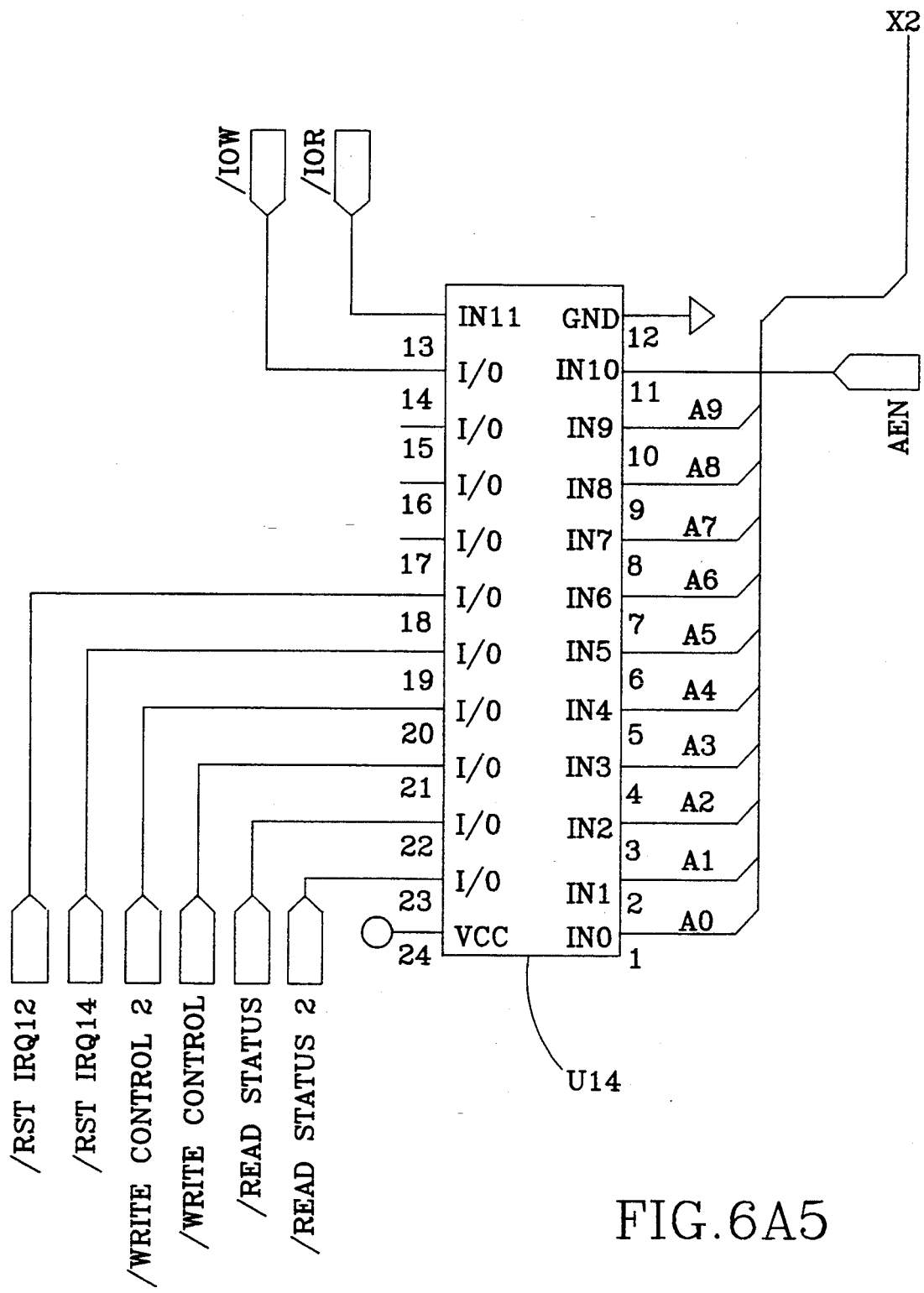
FIG.6A5

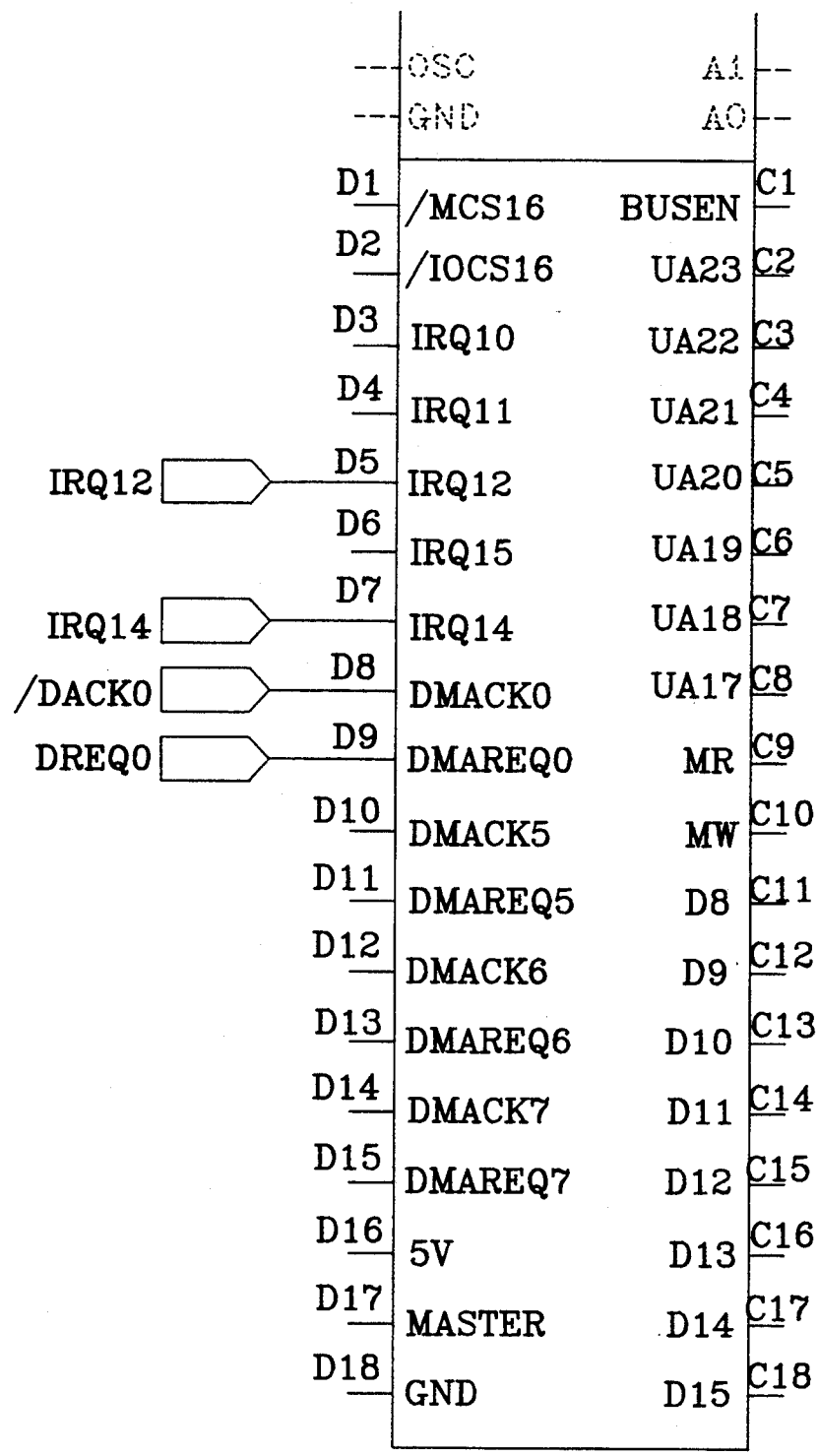
FIG.6A6

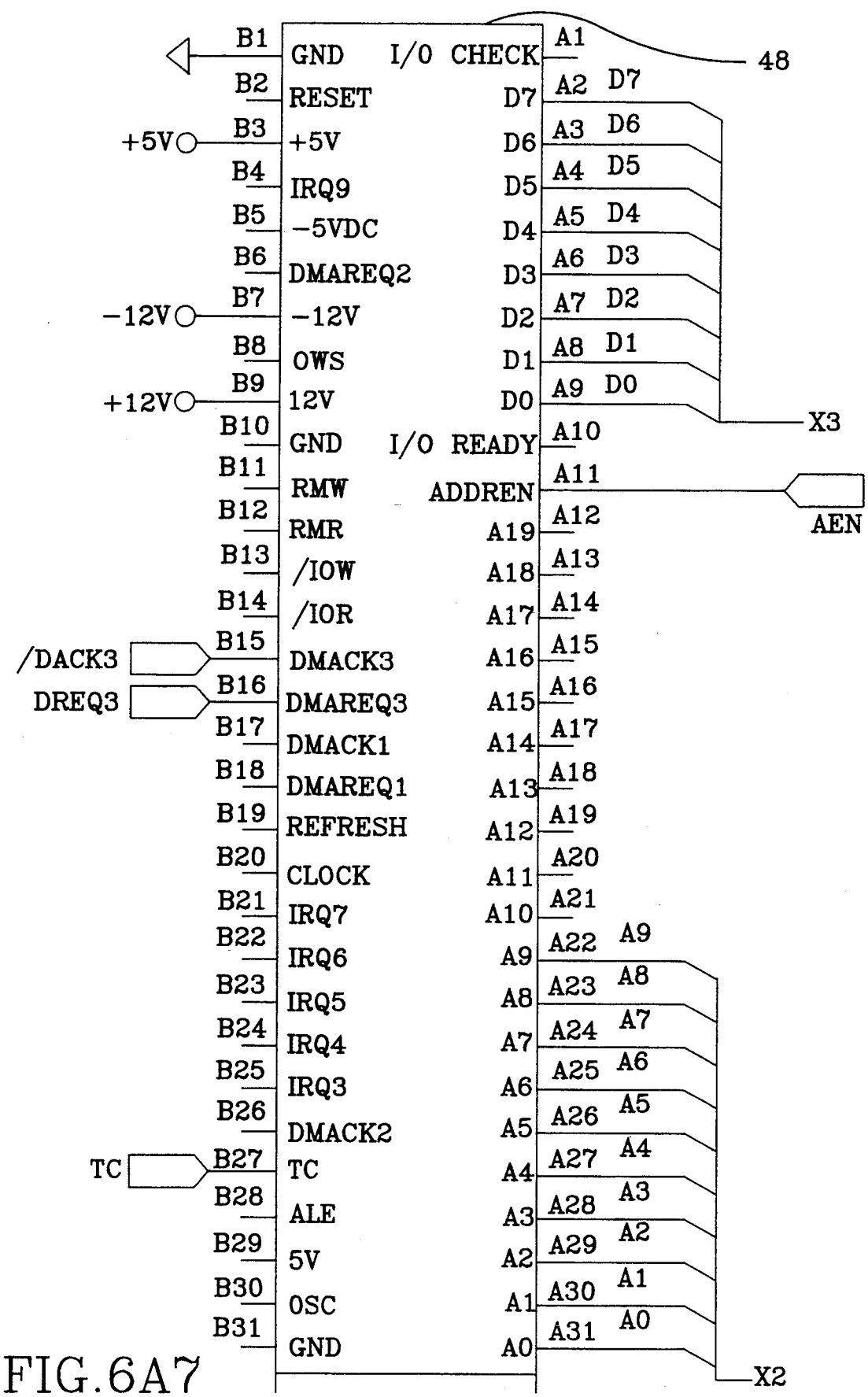
FIG.6A7

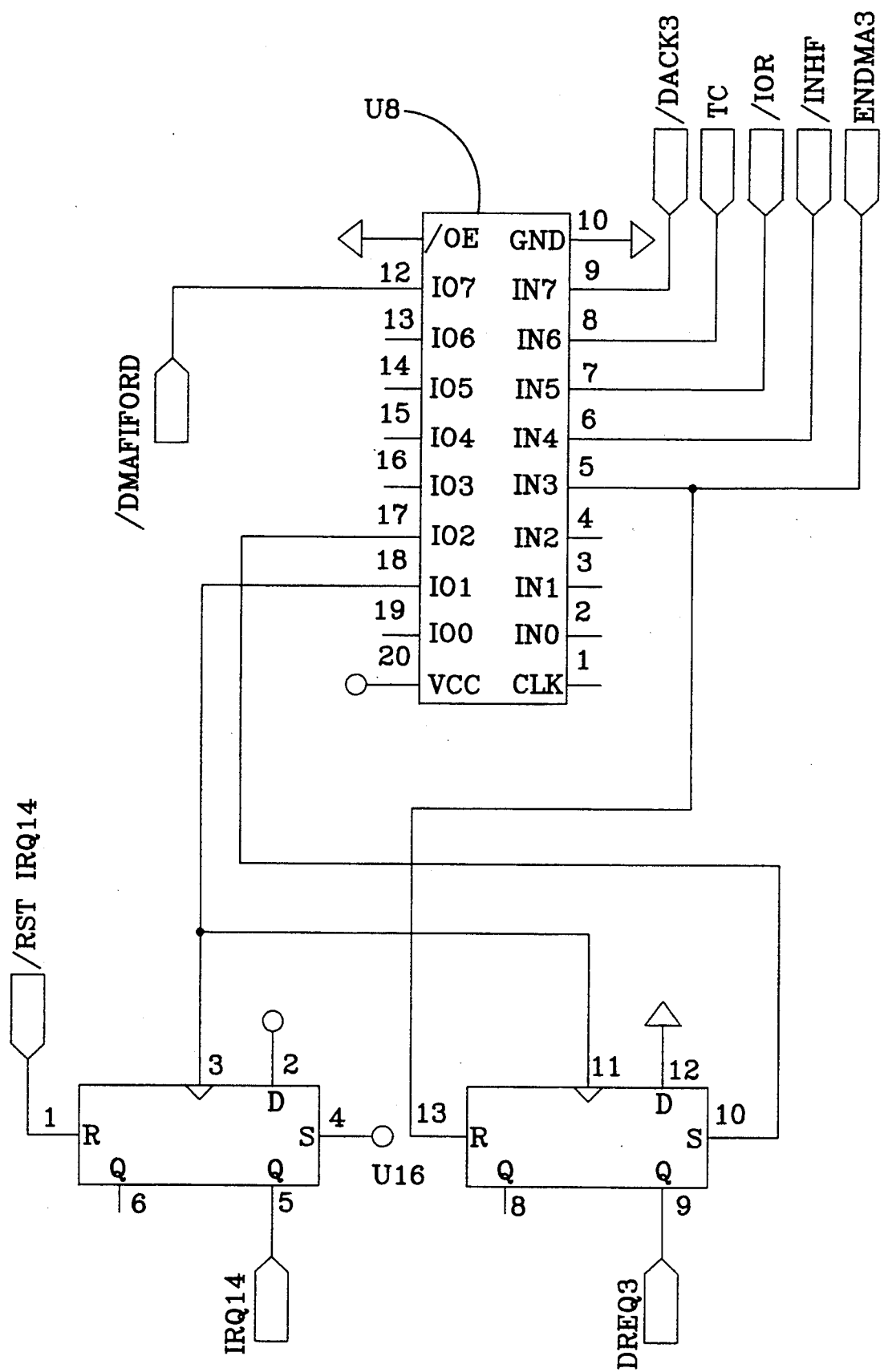
FIG.6B1

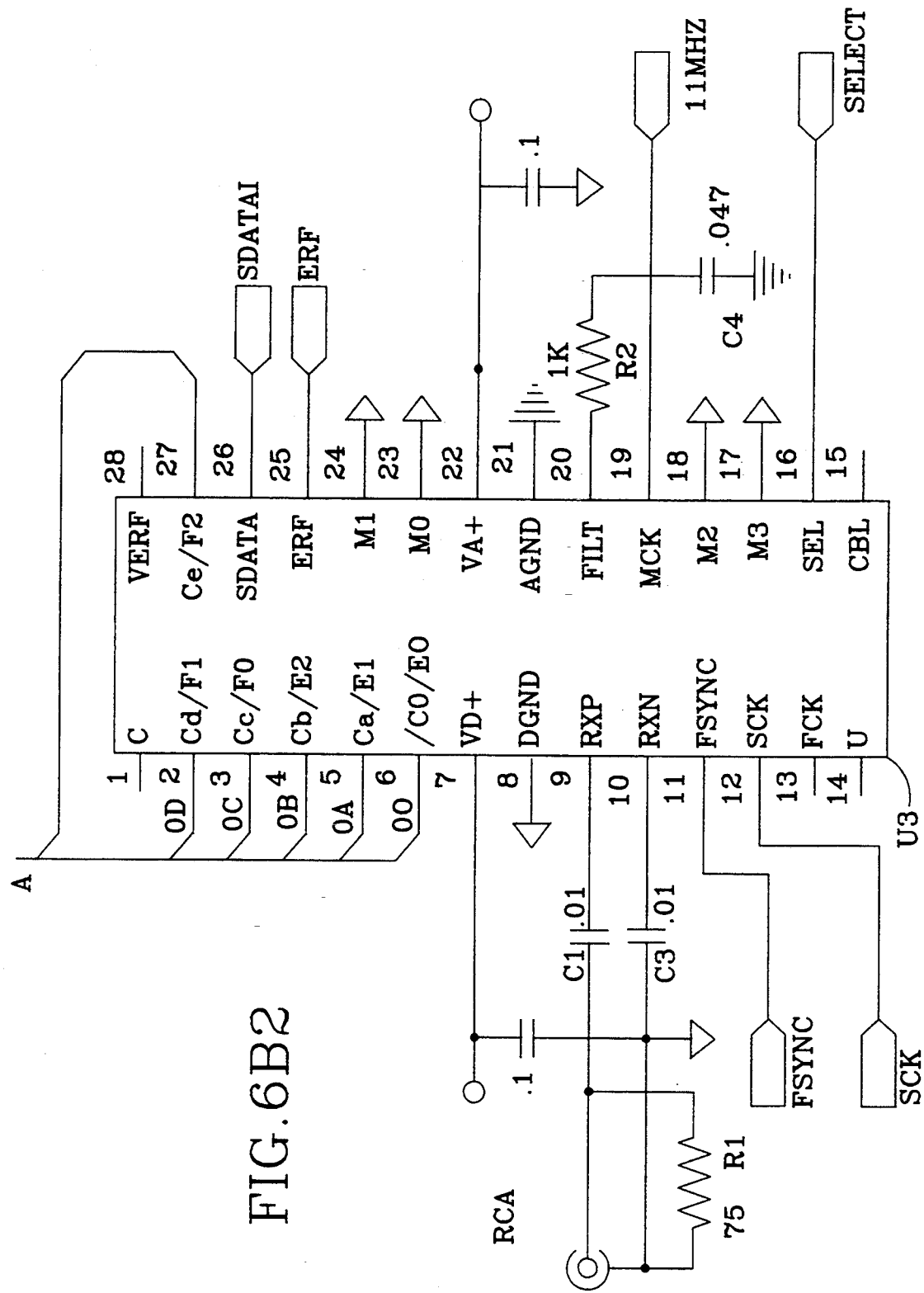
FIG.6B2

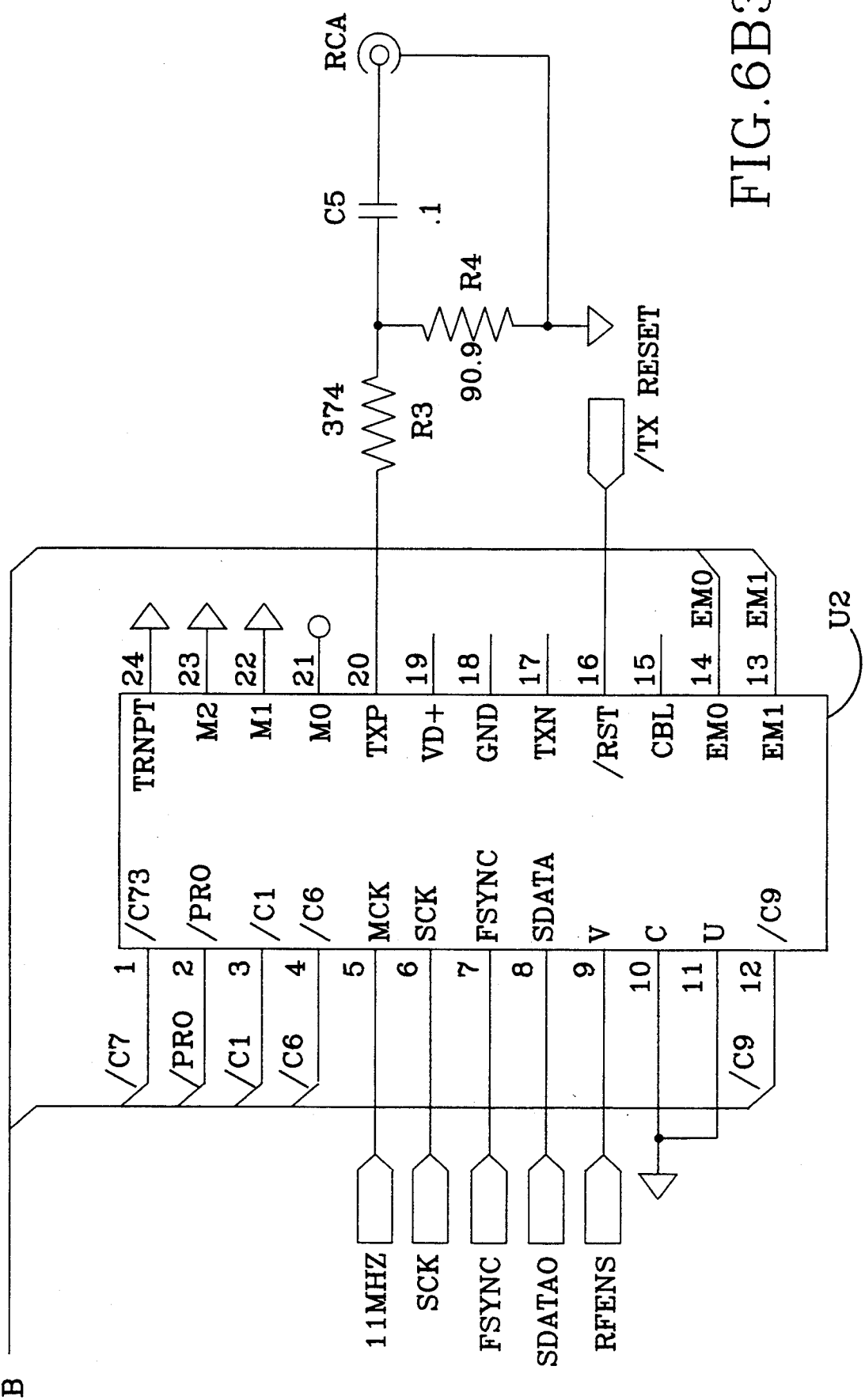
FIG. 6B3

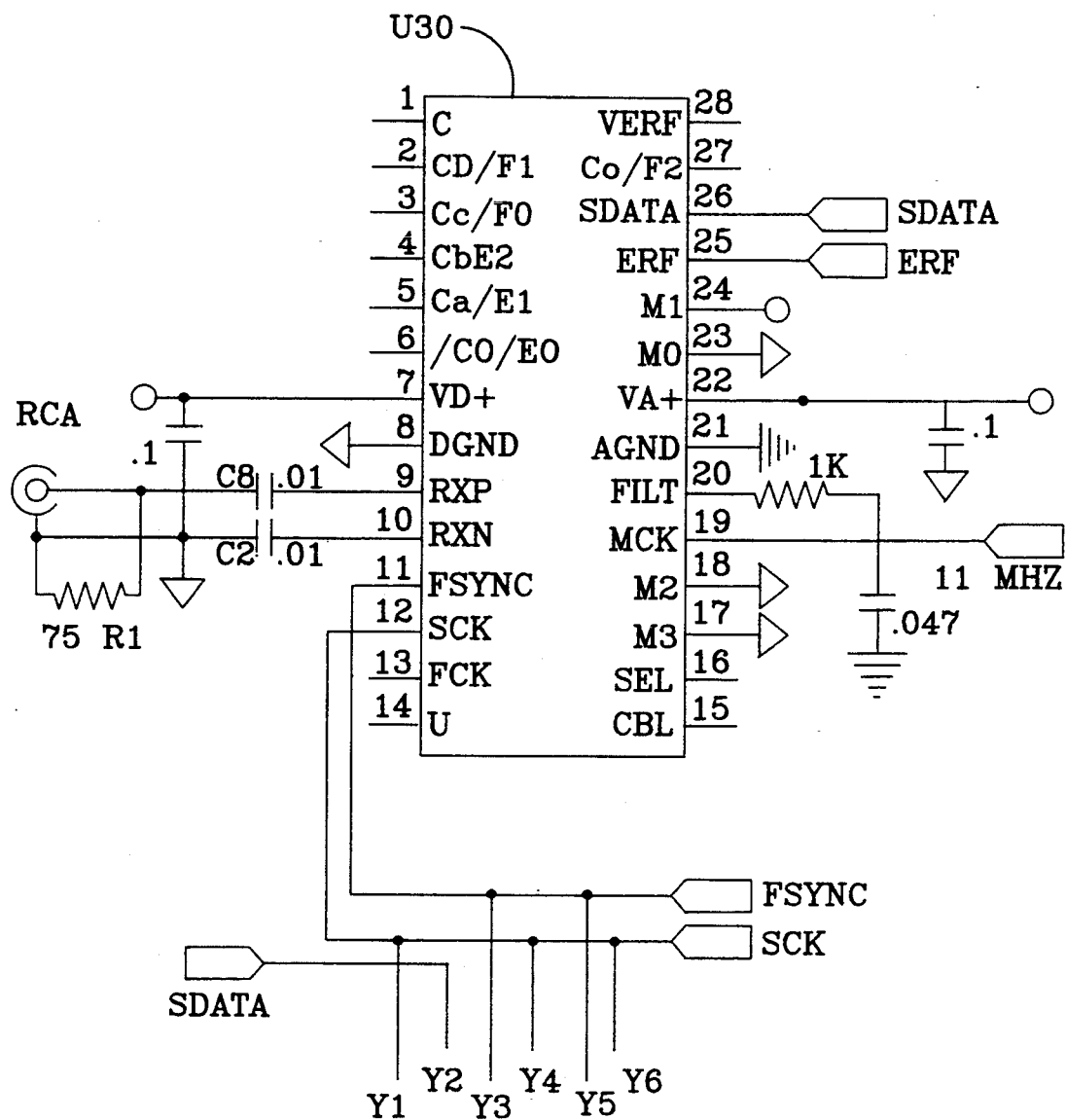
FIG.7A1

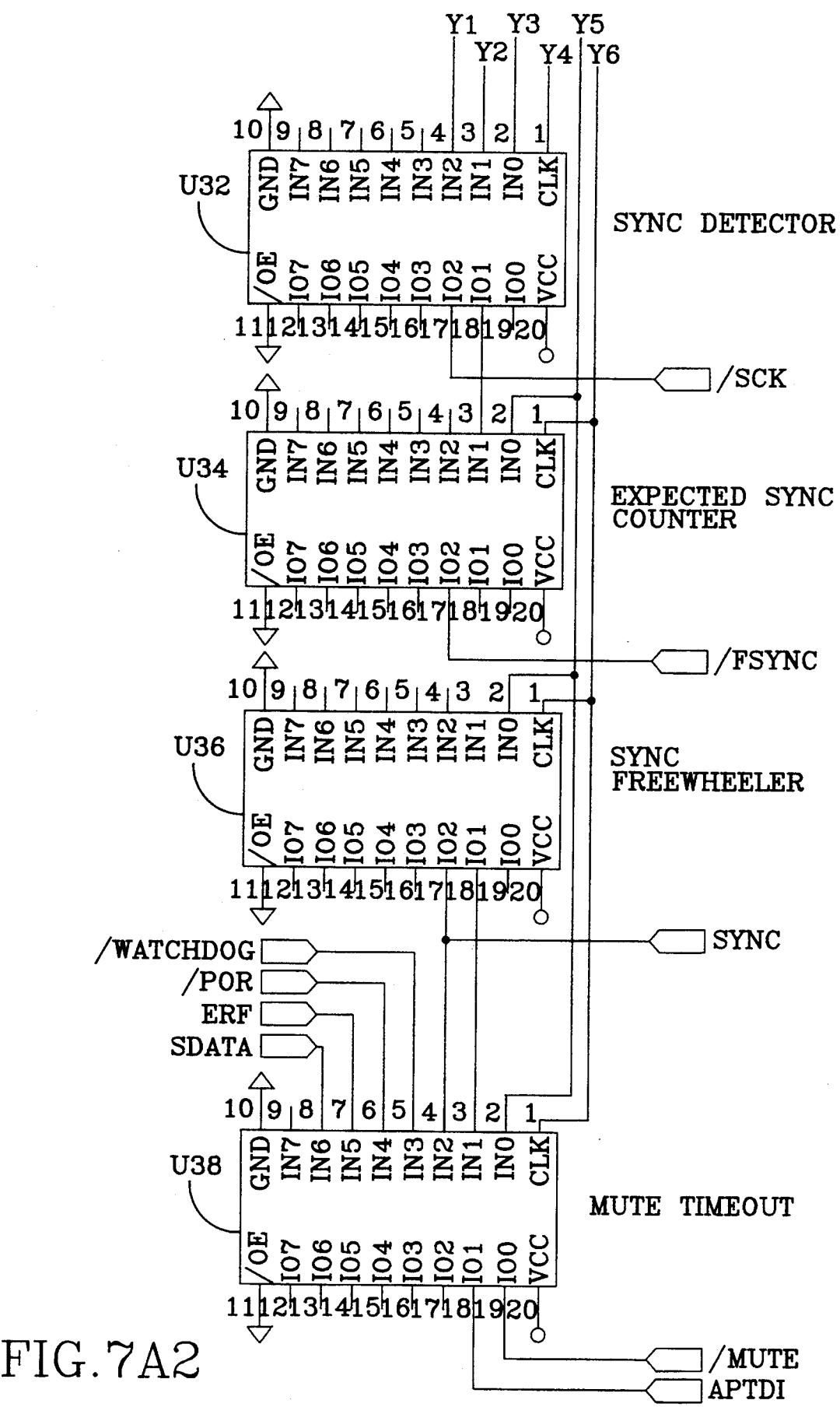
FIG. 7A2

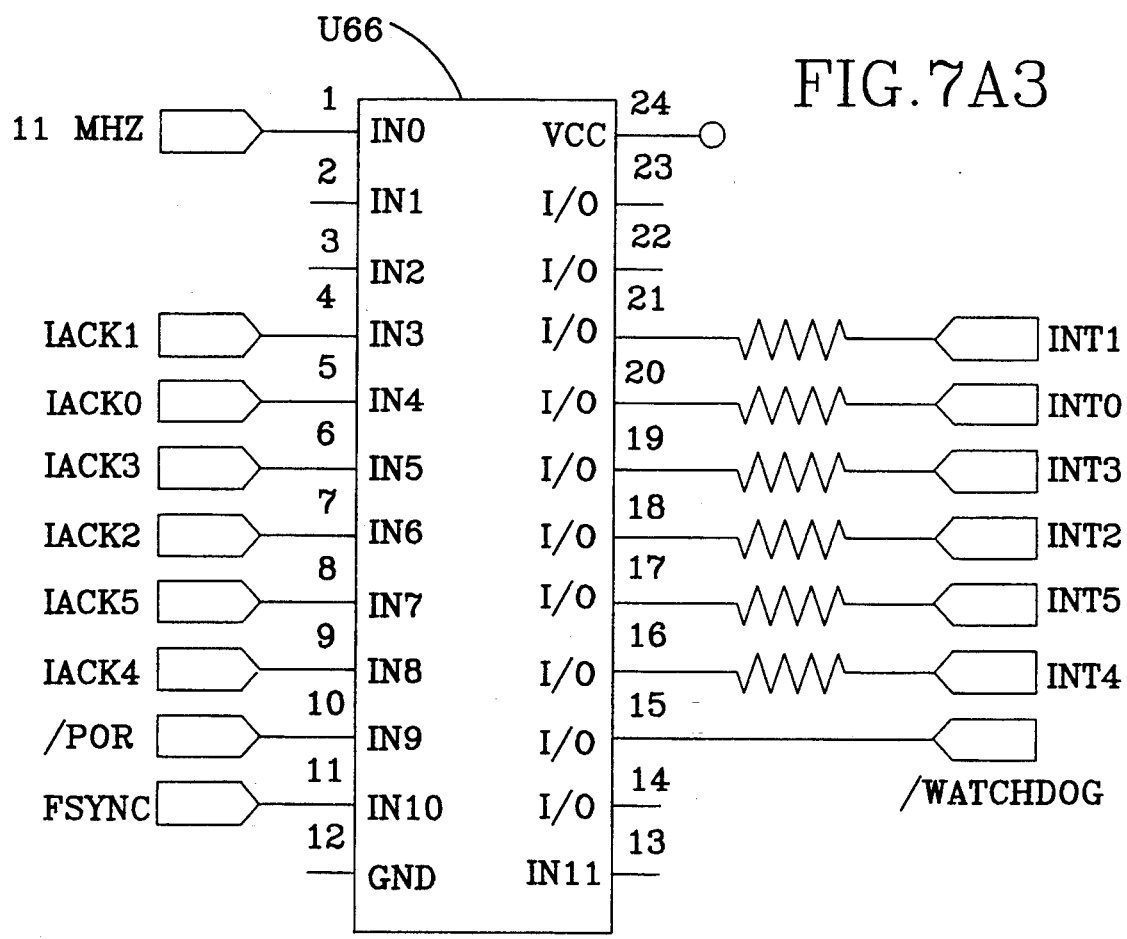
FIG.7A3
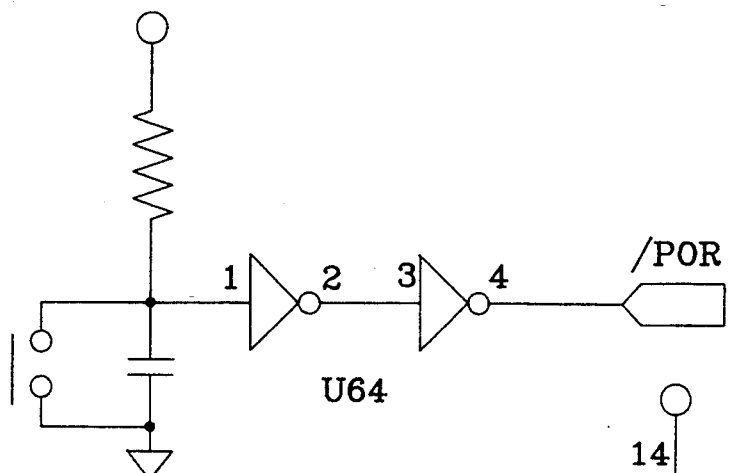
FIG.7A4
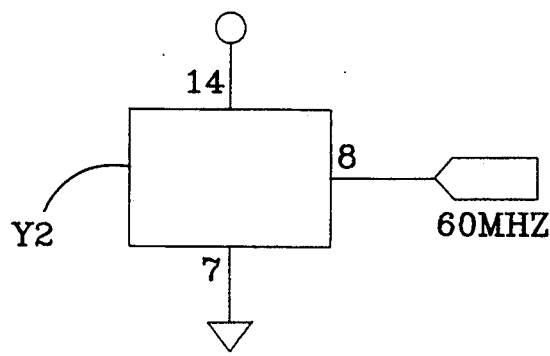
FIG.7A5

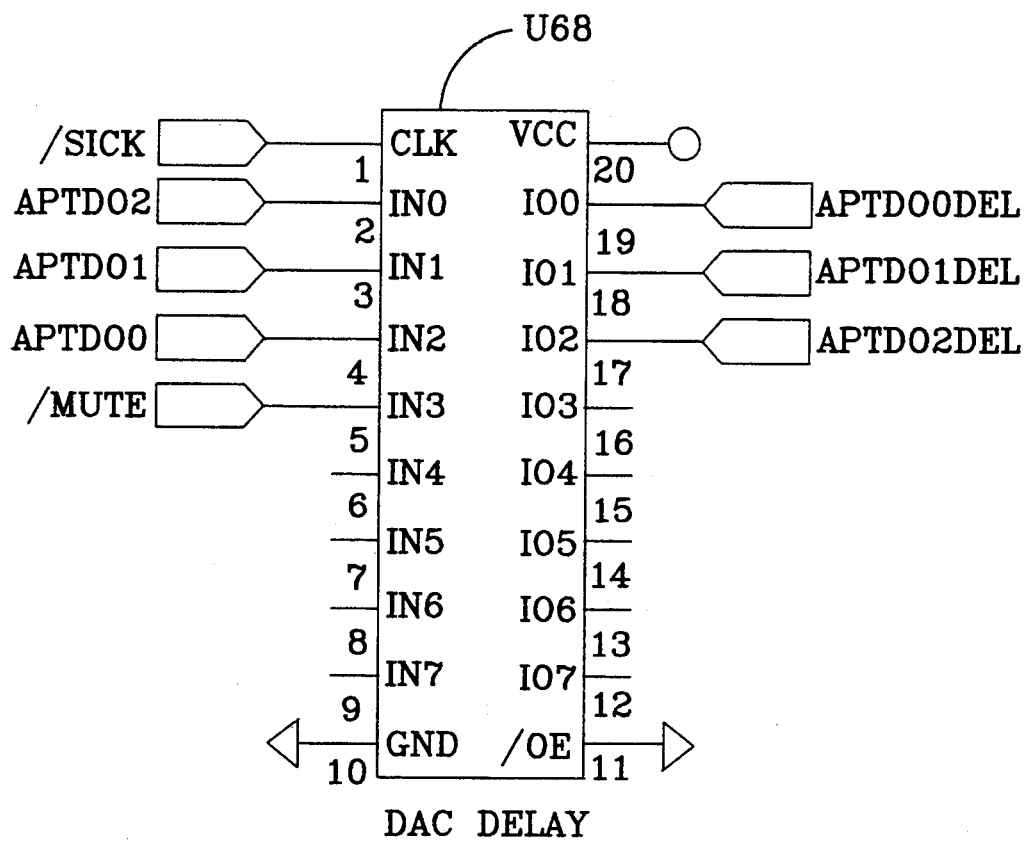
FIG.7A6
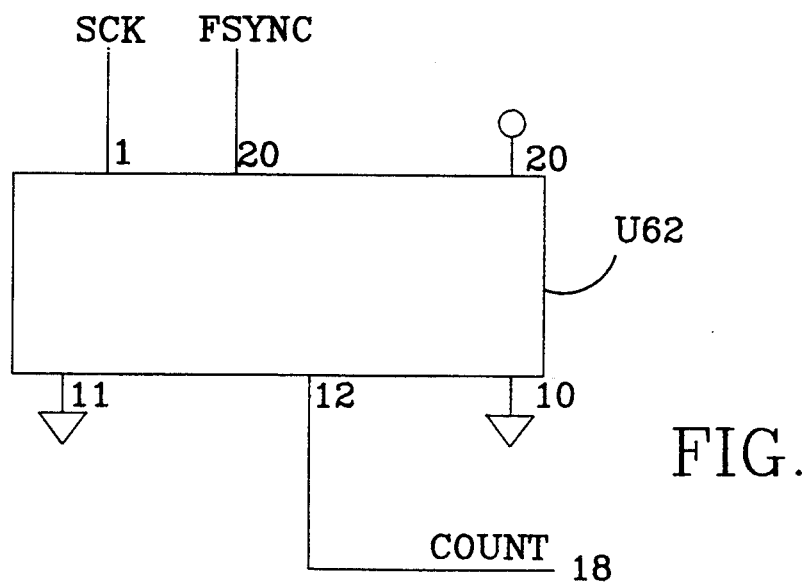
FIG.7A7

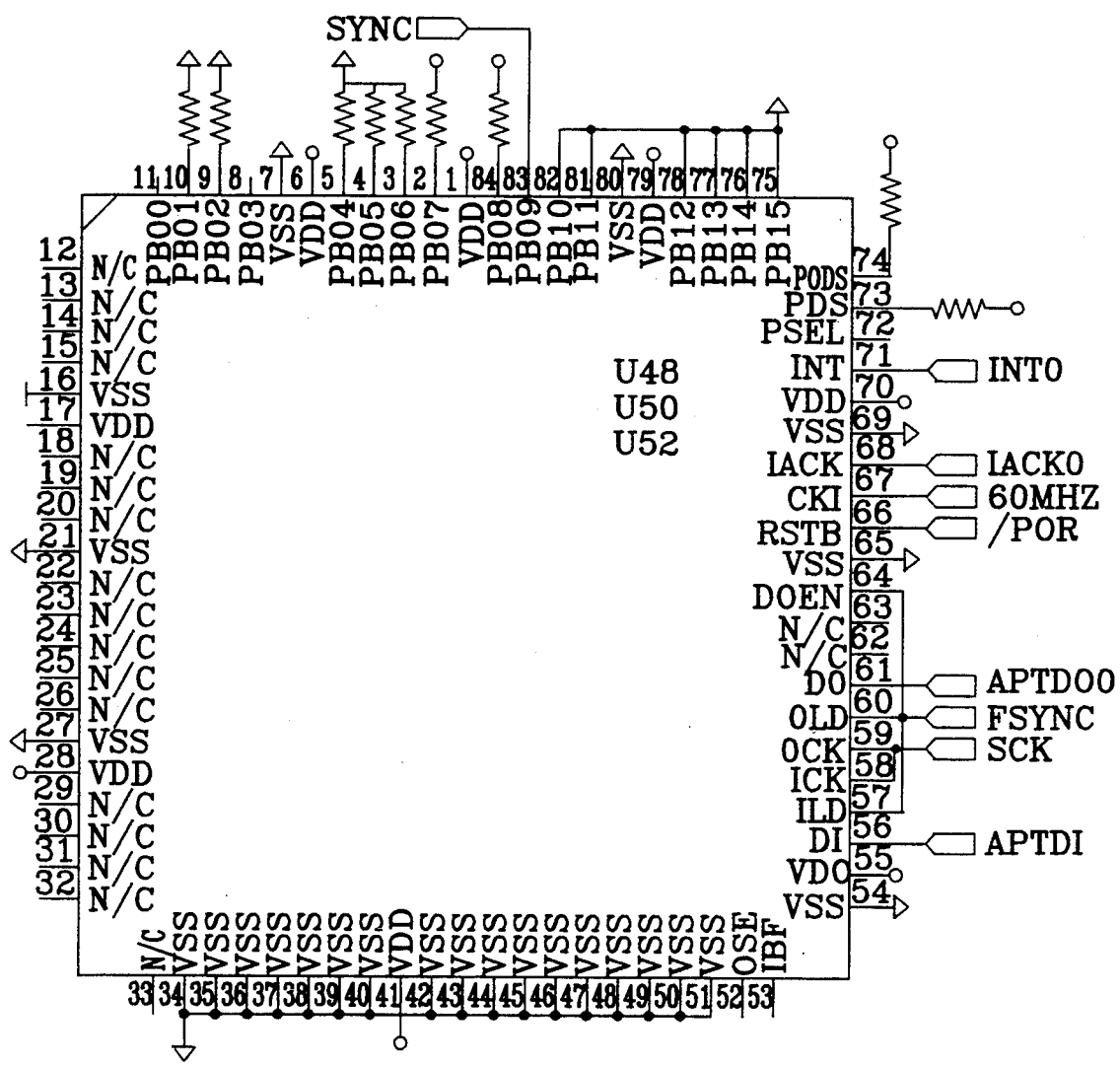
FIG. 7B1

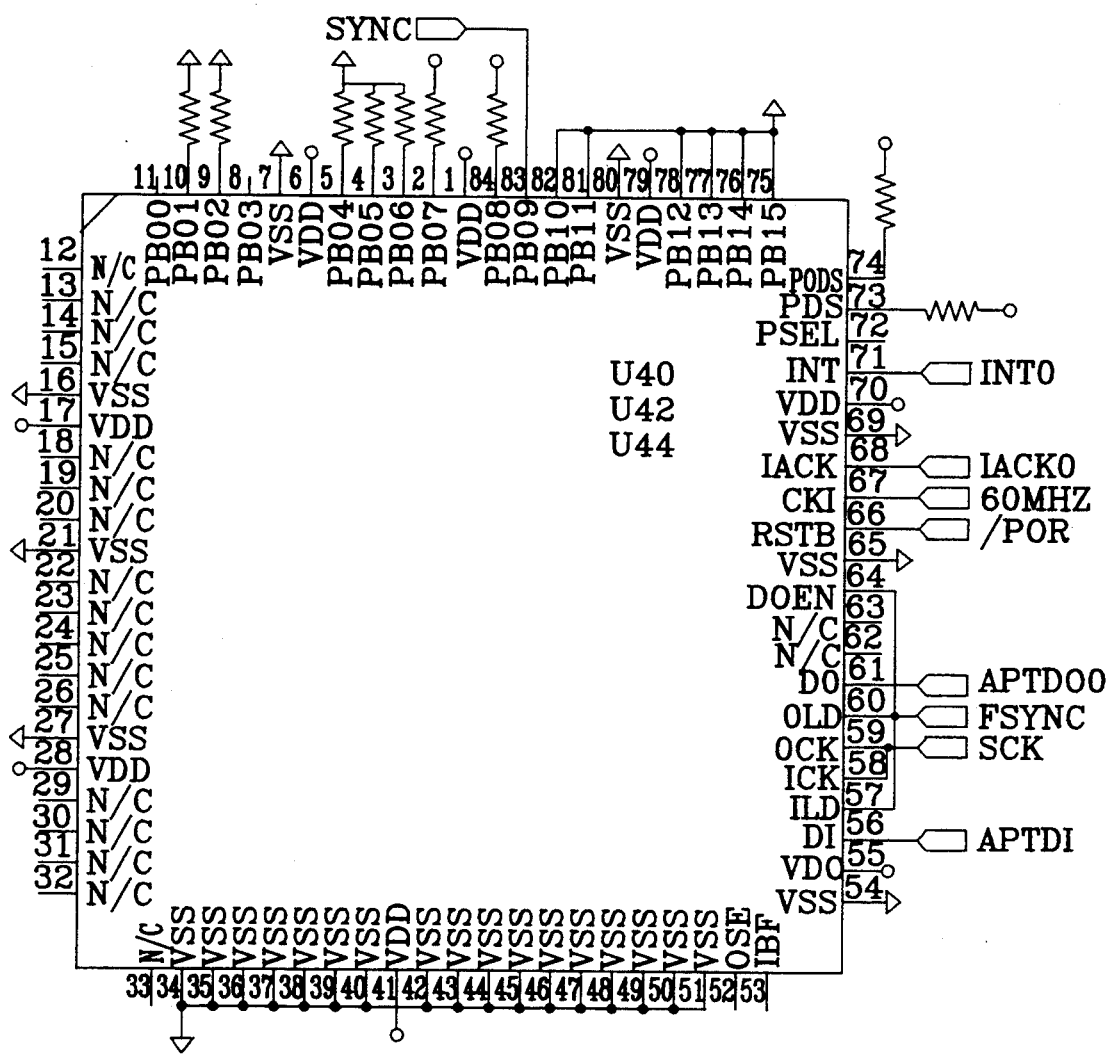
FIG. 7B2

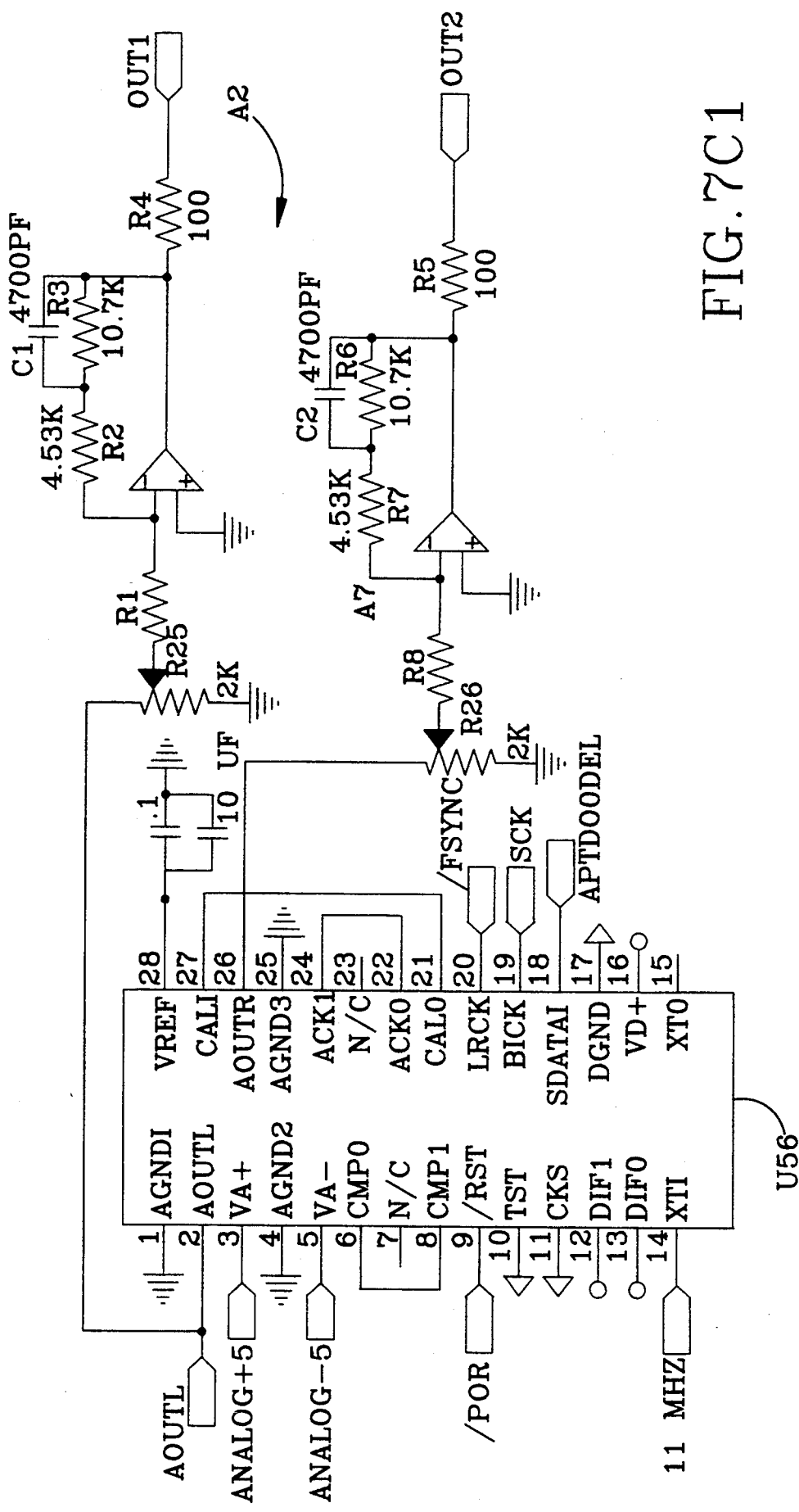
FIG.7C1

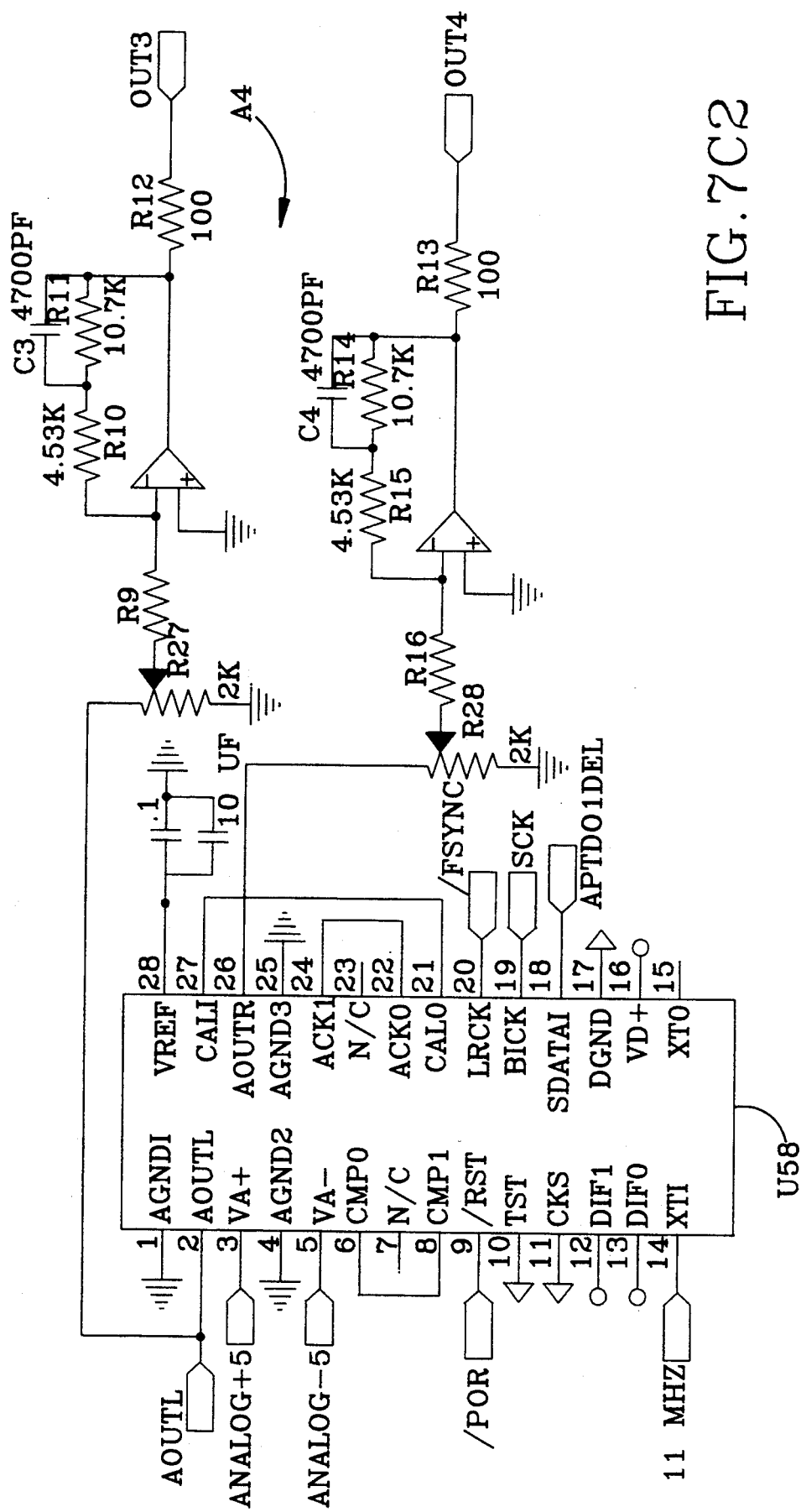
FIG. 7C2

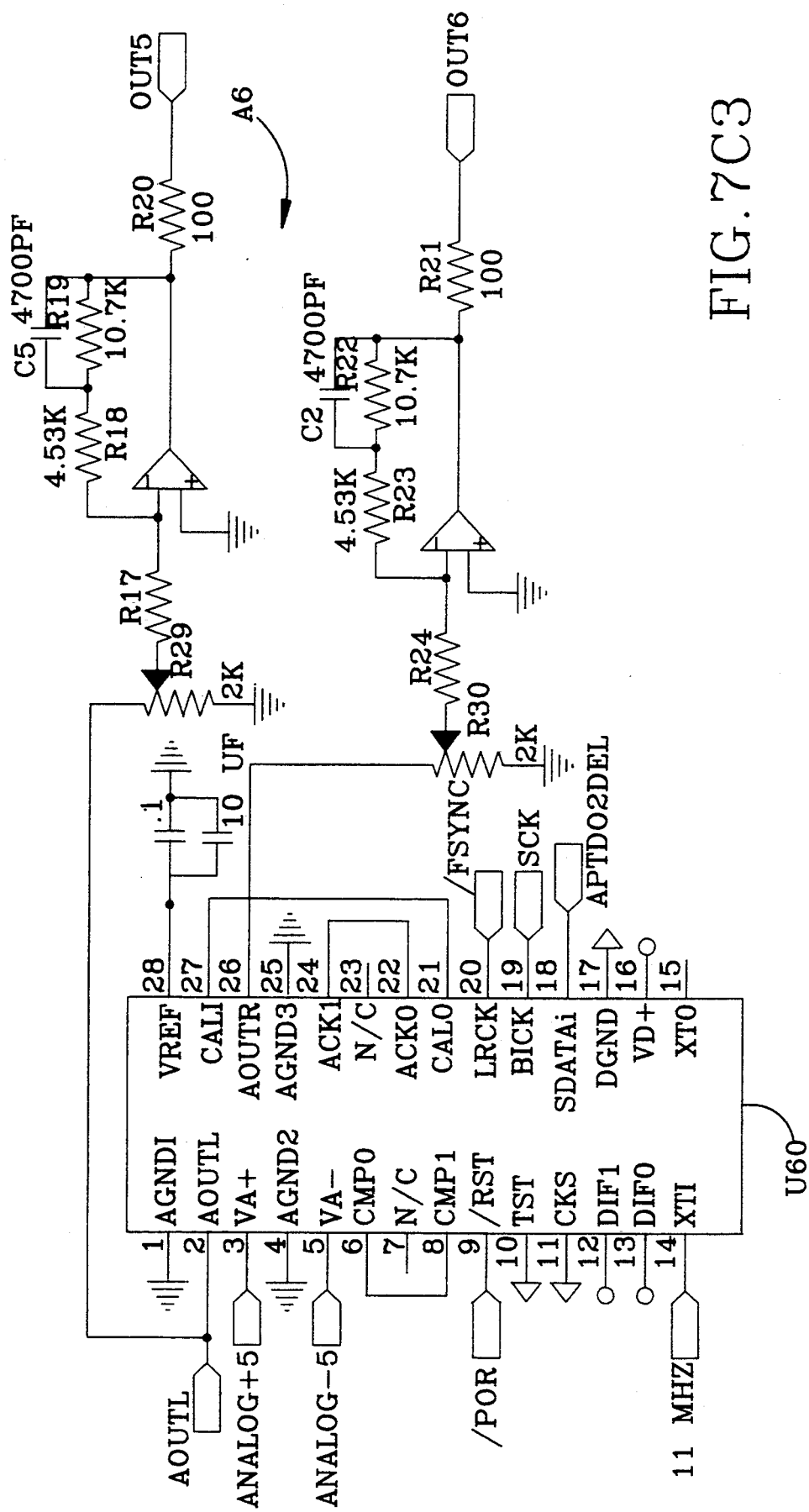
FIG. 7C3

METHOD AND APPARATUS FOR MULTIPLEXED ENCODING OF DIGITAL AUDIO INFORMATION ONTO A DIGITAL AUDIO STORAGE MEDIUM

BACKGROUND OF THE INVENTION

1. Field of the Invention

This invention relates to a method and apparatus for significantly expanding the effective capacity of laser disks, compact disks, digital audio tapes and other conventional digital audio recording media, and more particularly to a method and associated apparatus for multiplexing multiple digital audio signals onto the data channels currently occupied by the pulse code modulated (PCM) digital audio channels on such recording media.

2. Description of the Prior Art

A current standard consumer digital audio format is a two channel stereo 16-bit linear PCM system. This type of encoding is used for compact disks (CDs), laser disks and digital audio tape (DAT), as well as for professional digital tape recorders. It provides two audio channels with somewhat more than 90 dB of dynamic range, and recording times on the order of an hour for a conventional CD. A hierarchy of error correcting techniques are used to detect and correct bit errors, resulting in a system that provides reliable high quality stereo recording.

Although 16-bit linear digital audio provides good quality audio recording, it has not satisfied the very high quality standard desired by audiophiles. New 20-bit analog-to-digital encoders and digital-to-analog decoders have become available, but these devices are not compatible with the 16-bit linear PCM technology used on current CDs and laser disks; the improved quality of the new encoders and decoders therefore cannot be realized with the current digital audio standard.

The limitation of conventional digital audio recording media to two channel stereo and about one hour of recording time is also undesirable. The provision of six channel sound, for example, would create the potential for a listening experience akin to a fully equipped six-track theatrical environment. Furthermore, being able to record significantly more than one hour of sound on a single disk would be beneficial in many cases, while the very rapid disk access capability would still allow any desired portion of the recording to be accessed quickly and conveniently.

SUMMARY OF THE INVENTION

The object of the present invention is to provide a method and apparatus for storing much higher quality multi-channel digital audio on the stereo digital channels of conventional audio recording media such as CDs, laser disks and DATs and/or to make a longer recording than the medium is usually capable of. The system is flexible enough to handle numerous different kinds of audio inputs, and does not require exotic new components.

These objects are achieved by compressing the data bit rates of multi-track input digital audio signals so that their aggregate data bit rate after compression does not exceed the maximum data bit rate of the audio storage medium. The compressed signals are then multiplexed with each other to produce a multiplexed signal with a data bit rate that does not exceed the storage medium's maximum capacity. After encoding into a format used by the recording medium, such as conventional AES-/EBU, the multiplexed signal is recorded onto the storage medium. Playback is accomplished by reading out the recorded signals from the storage medium, decoding the read out signals in a manner complementary to the encoding, demultiplexing the decoded signals in a manner complementary to the multiplexing, and decompressing the demultiplexed signals in a manner complementary to the compression. The decompressed signals can then be processed through a digital-to-analog converter (DAC) and supplied to audio speakers.

The compression factor is selected relative to the data bit rates of the input signal channels, the data bit rate capability of the recording medium and the number of input channels, so that the aggregate data bit rate of the input signals after compression does not exceed the capability of the recording medium. With the recording medium configured to store audio samples having a predetermined number of bits per sample, the compressed input signals are multiplexed into data groups having the same number of bits. Although this results in some of the input samples being divided among different data groups, the complementary decoding process restores the integrity of the original samples.

To accommodate different input formats which require different types of multiplexing, an identifier code can be recorded along with the input signals to ensure that the demultiplexing is performed in a complementary manner. This can be accomplished either by dedicating one bit of the 32-bit AES/EBU subframes to an identifier, or by providing a separate mode identification input. When a large number of input tracks are present, as when an extended length relatively low quality input track is divided into a large number of sub-channels for successive encoding, intermediate storage media can be used to compile respective groups of input channels for multiplexing.

These and other features and advantages of the invention will be apparent to those skilled in the art from the following detailed description, taken together with the accompanying drawings.

BRIEF DESCRIPTION OF THE DRAWINGS

FIG. 1 is a block diagram of a system for encoding multiple digital audio inputs onto a digital storage medium that has a smaller capacity than the aggregate of the inputs;

FIG. 2 is a block diagram of a decoder system for playing back the digital audio signals from the storage medium;

FIGS. 6A1 through 6A7 and 6B1 through 6B3 together constitute a schematic diagram of an AES/EBU formatter employed in the preferred embodiment; and FIGS. 7A1 through 7A7, 7B1, 7B2 and 7C1 through 7C3 together constitute a schematic diagram of a decoder employed in the preferred embodiment.

DETAILED DESCRIPTION

Figure 3:
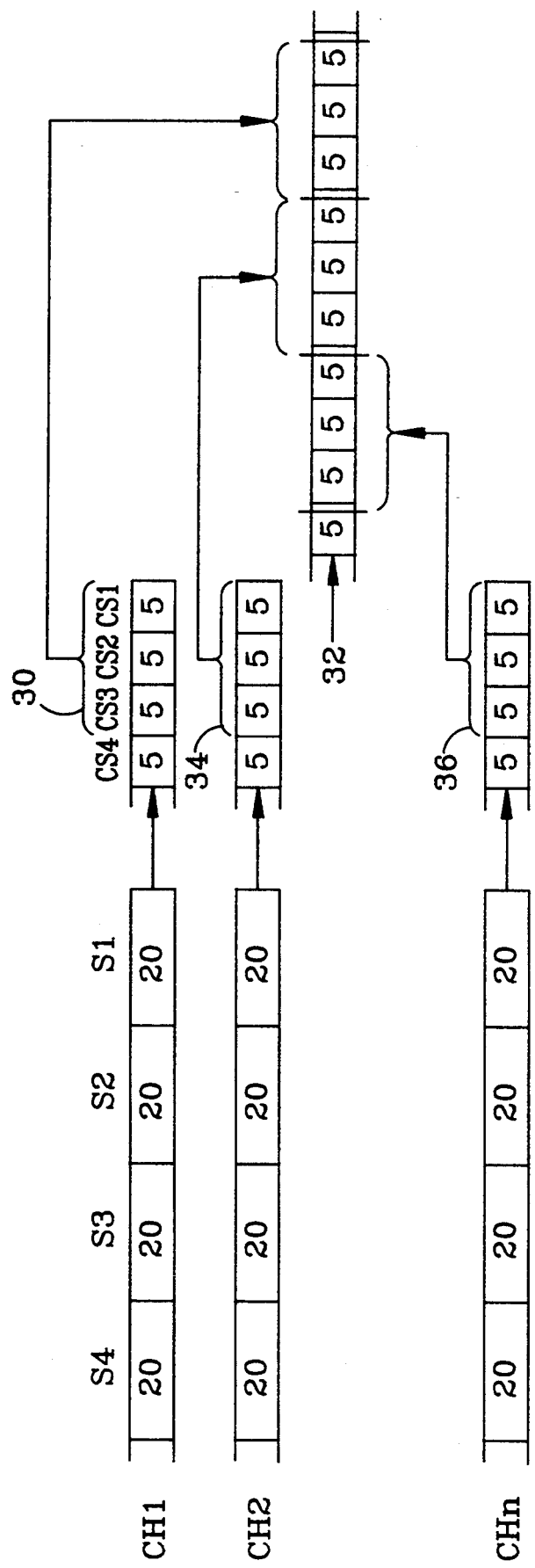
FIG. 3 is a diagram illustrating the compression and multiplexing of higher bit order audio input signals into a lower bit order data stream for recording on a digital audio storage medium.

The invention provides a way to encode six or even more very high quality (i.e. 20-bit) digital audio channels compatibly onto conventional stereo PCM data bit streams, and to thereby greatly expand the effective data storage capacity of digital audio storage media such as CDs, laser disks and DATs. For example, on a CD that normally holds only about one hour of stereo (two channel) 16-bit audio, either one hour of six track super hi-fi 20-bit audio, four hours of 16-bit stereo digital audio or forty hours of AM radio quality audio can be recorded.

A block diagram of the encoding system is given in FIG. 1. Multiple tracks of digital audio input signals CH1, CH2 . . . CHn are provided in a linear digital audio format, typically 16, 18 or 20 bits per sample. If the invention is used to record six channels of ultra high quality 20—20 KHz bandwidth digital audio signals, the input data is in the form of 20-bit linear PCM signals with a sample rate of 24,100 samples/second, which is the same sampling rate as for conventional stereo 16-bit linear encoded audio. For extended time AM quality audio encoding, forty channels of 20-4 KHz 16-bit linear PCMs, sampled at 8,820 samples per second, could be input into the system.

Each of the n input channels is applied to a respective data compressor C1, C2 . . . Cn, which compresses the input digital audio to a lower data bit rate. Data bit rate compressors of this type have previously been used for real-time radio and television broadcasting, and the same types of compressors could be used for this new application. Suitable data compressors include the Audio Processing Technology, Inc. APTX100, which reduces the data bit rate by a factor of four, the Dolby® AC-3, the Sony® ATRAC, and the European Musician compression algorithms.

The data compression algorithm is selected so that the aggregate of the data bit rates from the outputs of all of the compressors taken together does not exceed the data bit rate for the conventional two channels of 16-bit linear PCM audio. For example, if there are six input channels of 20-bit data, a 4:1 compression ratio will provide sufficient compression. Each of the six 20-bit input channels has a data bit rate that is 1.25 times the data bit rate of the 16-bit stereo channels, and there are three times as many input channels as stereo channels. The aggregate input signal data rate before compression is therefore 3.75 times the 16-bit data bit rate. Compressing the data bit rate of the input signals by a factor of 4 therefore satisfies the requirement that the aggregate compressed input data bit rate not exceed the 16-bit stereo data bit rate.

The compressed audio signals are multiplexed with each other by a multiplexer 2. The multiplexing may be accomplished in a number of different ways. The simplest is to cycle through the compressed inputs in a repetitive fashion, sequentially taking a bit or a group of bits from each compressed input at each cycle. In the preferred embodiment, described in further detail below, 16-bit data blocks are taken from each compressor in turn to produce a multiplexed output that is equivalent in data bit rate to a 16-bit two-channel stereo signal.

In the multiplexing process it is desirable that the multiplexed data be positionally stable in the data blocks of the preferred AES/EBU format, so that interpolation and substitutions by the basic CD or other digital storage medium error corrector causes a minimal audio error in the final multiplexed signals when they are played back. If, as in the case of the six channel 20-bit input audio signals discussed above, the aggregate data rate from the compressors is less than the 16-bit linear PCM stereo data rate, additional bit error correction can be incorporated in the digital multiplexer using conventional error correcting chip sets, such as the Reed Solomon error correcting code.

The output from multiplexer 2 can optionally be stored in a data file 4, such as a computer hard disk, where additional processing such as editing functions or the addition of synchronization signals can be performed. The multiplexed signal is then delivered to a conventional formatter 6 that places it in the proper format for recording on a digital audio storage medium; the conventional format at the time of this application is AES/EBU. The multiplexed signal is equivalent to two channels of 16-bit linear PCM in data rate, and thus appears as a conventional stereo signal to the AES/EBU formatter 6. Suitable formatters are produced by several companies, such as the CS8401 CS8402 digital audio interface transmitters by Crystal Semiconductor Corporation.

To maximize flexibility in handling different types of input audio signals, the multiplexer 2 should be adjustible to accomodate different numbers of input channels, and to allow for selectibility of the number of data bits taken from each channel during a multiplex cycle. The conventional AES/EBU formatter (also called an interface transmitter) includes a user bit input port 8 that allows the multiplex mode to be recorded within the AES/EBU bit stream. When this bit stream is decoded during playback from the digital recording medium, the multiplex mode information is used to control demultiplexing. Alternately, a shift register could be added to place compressed user information directly in the 20-bit audio data section of the AES/EBU format, which is described below. The formatted digital audio data is recorded by a conventional digital recorder 10 onto a digital record medium 12 such as a CD, laser disk, DAT, or any other digital audio recording medium design.

A decoding system that converts the recorded digital audio data to analog sound signals for driving audio speakers is shown in FIG. 2. It includes a conventional digital playback device 14 that senses the audio data recorded on the storage medium, and outputs the data as a standard AES/EBU serial bit stream. An AES/EBU interface receiver, such as the Crystal Semiconductor Corporation CS8411 or CS8412, operates in a manner complementary to the AES/EBU formatter 6 in FIG. 1 to produce an output that is equivalent to two channels of 16-bit linear PCM. The output of the AES/EBU interface receiver 16 is demultiplexed by a demultiplexer 18, which operates in a fashion complementary to the multiplexer 2 of FIG. 1. The AES/EBU user bits can be read by an optional microprocessor controller 20 and used to select any of a variety of multiplexing schemes used in the encoding process, with a suitable control signal delivered to the demultiplexer 18 along output line 22. The demultiplexing mode can alternately be manually selected, either directly or through a user input port 24 to the controller. Another output 26 from the controller sets the sample clock rate of the system's clock 28. For example, in the case of an extended AM-quality recording as opposed to a hi-fi quality recording, the sample rate is reduced from 44,100 to 8,820 samples per second; the clock rate must match the sample rate used in the recording process.

The bit streams output from the demultiplexer 18 are fed to digital audio decompressors D1, D2 . . . Dn in a manner complementary to the accessing of the compressed audio input signals from the compressors C1, C2 . . . Cn by multiplexer 2 in FIG. 1. Finally, the outputs from the decompressors D1, D2 . . . Dn are delivered to respective digital-to-analog converters DAC1, DAC2 . . . DACn. Here they are converted to analog signals that are transmitted over output lines O1, O2 . . . On to drive audio speakers. In the case of the highest current digital audio quality, the outputs from the DACs may be up to 22 or even 24-bit linear PCM code.

FIG. 3 illustrates the manner in which multiple audio input channels carrying very high quality audio signals, such as 20-bit, are processed by the system of FIG. 1 into signals that emulate a conventional 16-bit stereo input for the AES/EBU formatter 6. Input channels CH1, CH2 . . . CHn are illustrated as respective serial bit streams consisting of 20-bit samples S1, S2, S3, S4, etc. These input signals are compressed by compressors C1, C2 . . . Cn into 5-bit compressed samples CS1, CS2, CS3, CS4, etc. The multiplexer 2 cycles through the compressed channels, picking up 16 bits per channel in each cycle. This represents the bits from three complete samples, plus an additional bit from a fourth sample. In FIG. 3 a word 30 from CH1, consisting of three 5-bit samples plus the first bit from a fourth sample in the data bit stream for channel one, is acquired by the multiplexer and placed in the output multiplexed data bit stream 32. This is followed by the acquisition of a word 34 from CH2 that consists of three 5-bit samples plus an additional bit from a fourth sample, with this word immediately following word 30 in the multiplexed output. The multiplexing continues in this fashion through word 36 in the n channel, which again consists of three 5-bit samples plus an additional bit from the fourth sample. After the acquisition of a word from the last channel, another cycle is entered with a new 16-bit word from the first channel, beginning with the second bit in compressed sample CS4.

On its face, this multiplexing process does not preserve the integrity of the compressed samples for each channel, and thus might be expected to result in a loss of the input audio signals upon playback. However, because of the complementary nature of the playback demultiplexing, the integrity of the input samples is restored before decompression.

The compression factor applied to the input digital audio signals are compressed should be great enough to allow for the signals to be multiplexed in this fashion. First, for input data having a greater number of bits per sample than the bit density normally carried by the digital audio storage medium (such as 20 versus 16 bits), the compression factor should be at least as great as the ratio of the number of bits per sample in the input signals to the bits per sample normally stored on the storage medium. Second, when a greater number of input channels are provided than are normally stored on the storage medium (such as 6-channel input versus 2-channel stereo), the compression factor should be at least as great as the ratio of the number of input signal channels to the number of channels normally recorded on the storage medium. When the input signals have both a greater number of bits per sample and a greater number of channels than are normally recorded, the compression factor should be equal to at least the product of the above two ratios.

Figure 4:
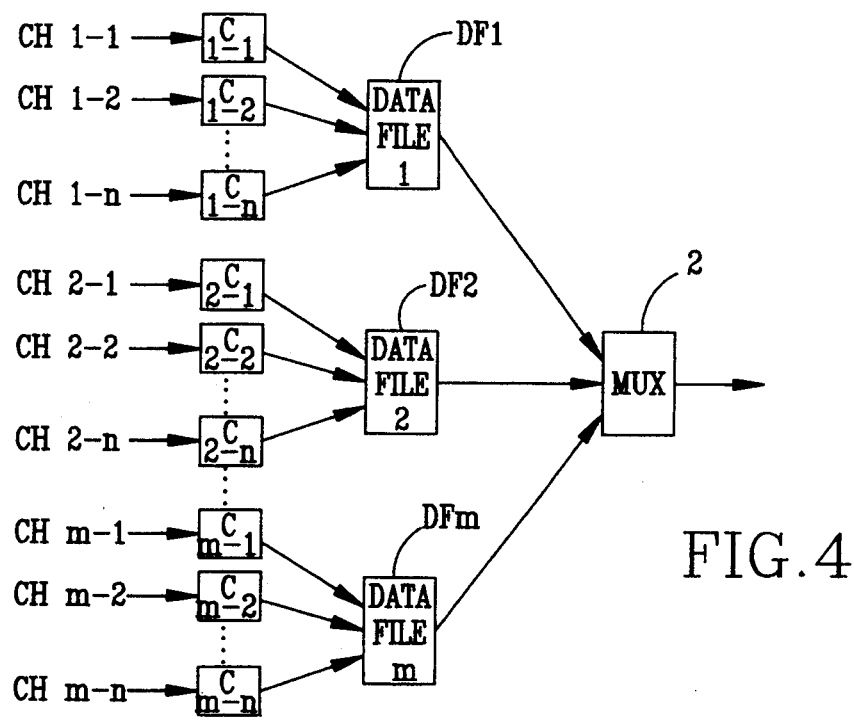
FIG. 4 is a block diagram of an alternate multiplexing scheme for a large number of input data channels.

FIG. 4 is a block diagram illustrating how a lengthy recording of relatively lower quality audio data, such as 40 hours of single track AM radio audio, can be made. The forty hours are divided into successive sections, such as forty one-hour sections, which each section treated as a separate channel. The various "channels" are organized into groups that can be conveniently handled, such as five groups of eight channels each; this is generalized in FIG. 4 so that each group consists of n channels. The identifying numbers 1-1 refer to the first channel of the first group, 1-2 to the second channel of the first group, 2-1 to the first channel of the second group, and so forth. The total number of groups is designated m.

Each of the channels CH1-1 through CHm-n is applied to a respective compressor C1-1 through Cm-n. The outputs of each group of compressors are in turn applied to respective data files DF1, DF2 . . . DFm. Each group of compressed audio inputs is merged and compiled by its respective data file, with the outputs from the data files multiplexed by the multiplexer 2. Further processing of the input audio signals proceeds as in FIG. 1.

If, for example, forty hours of AM-quality audio is to be recorded on a CD that normally takes one hour of two-channel stereo, the forty hours can be divided into five groups of eight channels each, with the forty hours of allocated among the channels in sequence. Each group of eight compressed channels is merged by a respective data file, with the outputs of the five data files multiplexed into an input for the AES/EBU formatter that emulates a normal 16-bit stereo signal. In the decoder section, a complementary data file arrangement is provided to store the decoded channels 1-2 through m-n while channel 1-1 is converted to analog format and played out by the speakers. During the hour required to play out channel 1-1, all of the other channels would be accumulated in their respective data files. Each subsequent channel in succession would then be played out until the full forty hours has been completed. This playback can be interrupted at any time as desired.

The use of an intermediate hard disk data file provides a great deal of flexibility, since the simultaneous input of all channels is not necessary. For example, the system can also be used to record over four hours of stereo digital audio by recording the four hours of two channel input audio information through data compressors onto a hard disk intermediate data file, and then compiling the signals into the eight channel format and outputting them in parallel to the AES/EBU format.

Figure 5:
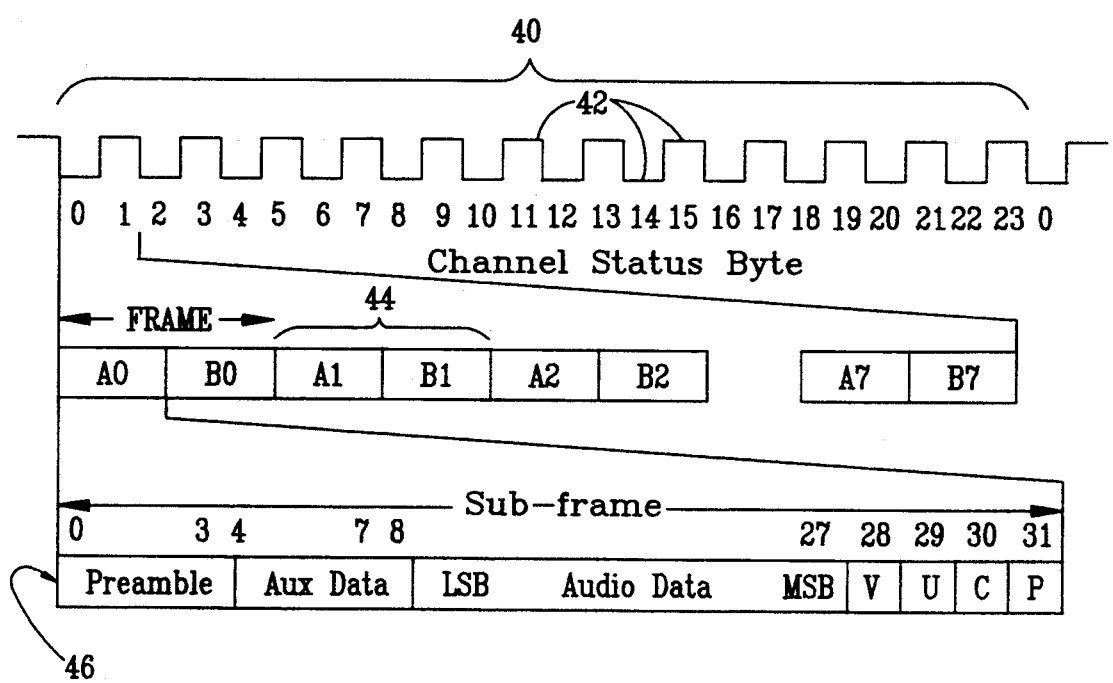
FIG. 5 is a data diagram illustrating the conventional AES/EBU interface standard employed in a preferred embodiment of the invention.

The AES/EBU format presently used is illustrated in FIG. 5, and is discussed in further detail in publications such as Crystal Semiconductor Corporation Digital Audio Products Data Book, January, 1994, pages 6-35 through 6-68. The AES/EBU data is organized into blocks 40, which each block consisting of twenty-four channel status bytes 42. Each byte includes eight frames 44 and each frame has a pair of sub-frames 46, with each sub-frame including thirty-two bits. The blocks 40 thus include 384 thirty-two bit sub-frames 46. Within each sub-frame the first four bits 0-3 are reserved for a preamble, bits 4-7 for auxiliary data, bits 8-27 for audio data, bit 28 for a validity indicator, bit 29 for user data, bit 30 for channel status data and bit 31 for a parity bit. Bit 29 can be used to encode the current multiplexing mode; since a total of 384 of these user bits are available per block, virtually any number of multiplexing modes can be specified.

FIGS. 6A1 through 6A7 and 6B1 through 6B3 taken together are a schematic diagram of a particular embodiment of the AES/EBU formatter (transmitter) 6 shown in FIG. 1. The part numbers mentioned below in connection with the FIGS. 6A1–6A7 and 6B1–6B3 circuit are industry standard nomenclature, except for the Crystal Semiconductor Corp. CS8401 AES/EBU transmitter U2 and a Crystal Semiconductor Corp. CS8412 AES/EBU receiver U3 which receives the AES/EBU signal to generate clocks for the transmitter. The circuit includes a 75CO1 transmit buffer FIFO U4, a programmable array logic PALCE22V10 parallel-to-serial converter U6, a PALCE16V8 U8 for transmitting DMA timing, a pair of PALCE16V8s U10 and U12 for AES/EBU receive/transmit timing, a PALCE22V10 U14 address decoder, a dual 74HCT74 U16 for transmit DMA handshaking, a pair of 74HCT374 control registers U18 and U20, a pair of 74HCT244 status registers U22, and U23 and an edge connector 48 to the IBM computer.

The IBM data files 4 are transferred by DMA to transmit FIFO U4. The transfer is controlled by signal /OUTHF, the FIFO half full flag. The IBM computer bus signals /IOW, TC, IRQ12 and DREQ0 sequence the DMA. DMA is enabled by control signals/ENDMA0. Signal SCK is the serial shift clock, and FSYNC is the frame sync; the nominal FSYNC rate is 44.1 KHz. Four bytes per cycle of FSYNC are transferred from the output of the transmit FIFO U4 to the parallel-to-serial converter U6. SDATAO, the serial output of U6, is shifted into AES/EBU transmitter U2. Port 11 of U2 is the user bit input (number 8 in FIG. 1), which is clocked by FSYNC. Port 20 of U2 is the AES/EBU transmit output. The digital recorder (number 10 in FIG. 1) is any recorder able to accept AES/EBU formatted data, for example a D3 format video recorder.

A schematic diagram of a specific decoder scheme is shown in FIGS. 7A1 through 7A7, 7B1, 7B2 and 7C1 through 7C3 taken together. The decoder includes a Crystal Semiconductor Corp. CS8412 AES/EBU receiver U30; four PALCE16V8s U32, U34, U36 and U38 respectively for SYNC detection, detect sync spacing, free wheel over sync dropouts, and mute after three milliseconds of no sync; six APTX100 4:1 audio decompressors U40, U42, U44, U48, U50 and U52 by Audio Processing Technology Inc.; three CS4328 digital-to-analog converters U56, U58 and U60 by Crystal Semiconductor Corp.; a PALCE16V8 interrupt timer U62 for the decompressors; a 74HC14 power on reset U64; a PALCE22V10 APT interrupt generator U66; a PALCE16V8 APT output delay U68; an MTO-T1-60 MHz APT DSP clock 42; and three TL072 dual output amplifiers A2, A4 and A6. An addressing table 50 is given for decompressors U40, U42, U44, U48, U50 and U52.

The AES/EBU receiver U30 decodes the AES/EBU data from the digital recording medium; it performs the function of the AES/EBU receiver 16 in FIG. 2. The FSYNC output is the frame sync, with a frequency of once per sample, nominally 44.1 KHz. The SCK output is the bit clock, which is the shift clock for the decoder. The SDATA output is the serial data, which goes to the sync detection circuitry and the audio decompressors. The 11 MHz output is the output of the U30 phase lock loop, which is used to clock the digital filtering in the U56-U60 DACs. U30-14 is the user bit output, which is clocked out by FSYNC. U32 detects the sync pattern in the serial data; in this embodiment the sync mark is a hexadecimal $55AA in multiplexed timeslot 7. U32-18 is the sync detection signal. The /SCK output of U32 clocks U68, which adds a ½ bit delay to create output signals APTDO0DEL, APTDO1DEL and APTDO2DEL, which is the data to the DACs U56–U60.

Port U34-18 indicates that the last three sync marks were in the proper location, while the /FSYNC output is used to distinguish between odd and even time slots of the multiplexed data. Port U36-17, SYNC, identifies the time slots for the APT audio decompressors. It is synchronized by the U34-18 signal. U36-18 indicates that SYCH and U34-18 are coincident; this information is used to reset the counter U38, which mutes the decoder after sync is not received for three milliseconds. APTDI, the decoder serial input data, is set to zero if muted. The /MUTE signal sets the U68 outputs to zero if muted.

The decompressed outputs from the audio decompressors U40, U42, U44, U48, U50 and U52 are labeled APTDO0 to APTDO2, and are multiplexed in pairs. The audio decompressor DACs U56, U58 and U60 are the digital-to-analog converters that correspond to elements DAC1, DAC2 ... DAC n in FIG. 2. Each of the dual amplifiers A2, A4 and A6 include two amplifiers each, providing a six-channel output capability.

While particular embodiments of the invention have been shown and described, numerous variations and alternate embodiments will occur to those skilled in the art. Accordingly, it is intended that the invention be limited only in terms of the appended claims.

We claim:

1. A method of recording multi-channel digital audio information having a predetermined data bit rate onto a permanent digital storage medium, comprising:
   providing a permanent digital storage medium that is capable of storing digital audio signals which it receives in a predetermined format and at a data bit rate that does not exceed a predetermined maximum data bit rate,
   providing multi-channel input digital audio signals with an aggregate data bit rate that exceeds said maximum data bit rate,
   compressing the data bit rates of said multi-channel input digital audio signals so that their aggregate data bit rate after compression does not exceed the storage medium's maximum data bit rate,
   multiplexing said compressed digital audio signals into a multiplexed signal with a data bit rate that does not exceed the storage medium's maximum data bit rate,
   encoding said multiplexed signal into said predetermined format, and
   recording said encoded signal on said digital storage medium.

2. The method of claim 1, wherein said digital storage medium is configured to store a two-channel stereo recording.

3. The method of claim 2, wherein said digital audio signals are provided as more than two channels of linear pulse code modulated (PCM) signals, and said multiplexing step produces an output that is equivalent in data bit rate to a two-channel stereo signal suitable for recording on said digital storage medium.

4. The method of claim 2, wherein more than two channels of input digital audio signal are provided.

5. The method of claim 4, wherein said multiplexing is accomplished by repetitively cycling through said input digital audio signals.

6. The method of claim 2, wherein said input digital audio signals are provided as successive channel portions of a single extended signal track.

7. The method of claim 1, wherein said digital storage medium is configured to store audio sample signals having a predetermined number of bits per sample, said input digital audio signals are provided as audio samples having a greater number of bits per sample than said predetermined number, and the data bit rates of said input digital audio signals are compressed in said data bit rate compression step by a factor at least as great as the ratio of the bits per sample for said input digital audio signals to said predetermined number of bits per sample.

8. The method of claim 7, wherein said digital storage medium is configured to store a predetermined number of audio channels, and the data bit rates of said input digital audio signals are compressed by a factor at least as great as said bits per sample ratio multiplied by the ratio of the number of input signal channels to said predetermined number of audio channels.

9. The method of claim 8, wherein said compressed digital audio signals are multiplexed into said multiplexed signal in data groups having said predetermined number of bits.

10. The method of claim 1, wherein the aggregate data bit rate of the compressed input digital audio signals is less than the maximum data bit rate of said permanent digital storage medium, further compressing the step of multiplexing a bit error correction algorithm along with said compressed digital audio signals for encoding into said predetermined format and recording on said digital storage medium.

11. The method of claim 1, wherein said encoding step comprises encoding said multiplexed signal into an AES/EBU format.

12. The method of claim 11, wherein said AES/EBU format is organized into 32-bit subframes, and one of the bits of said subframes is dedicated to identifying the type of multiplexing that has been performed.

13. The method of claim 1, further comprising the step of compiling respective sets of said digital audio signals in intermediate digital storage media after said compression step, with said multiplexing step operating upon said compiled sets of signals.

14. A method of storing and playing back multi-channel digital audio information having a predetermined data bit rate, comprising:
providing a permanent digital storage medium that is capable of storing digital audio signals which it receives in a predetermined format and at a data bit rate that does not exceed a predetermined maximum data bit rate,
providing multi-channel input digital audio signals with an aggregate data bit rate that exceeds said maximum data bit rate,
compressing the data bit rates of said multi-channel input digital audio signals so that their aggregate data bit rate after compression does not exceed the storage medium's maximum data bit rate,
multiplexing said compressed digital audio signals into a multiplexed signal with a data bit rate that does not exceed the storage medium's maximum data bit rate,
encoding said multiplexed signal into said predetermined format,
recording said encoded signal on said digital storage medium,
reading out the recorded signals from said digital storage medium,
decoding the read out signals in a manner complementary to said encoding,
demultiplexing the decoded signals in a manner complementary to said multiplexing, and
decompressing the demultiplexed signals in a manner complementary to said compressing.

15. The method of claim 14, wherein said encoding step comprises encoding said multiplexed signal into an AES/EBU serial bit string format, and said recorded signals are read out from said digital storage medium as an AES/EBU serial bit string.

16. The method of claim 14, wherein an identifier of the type of multiplexing that has been performed is encoded into said predetermined format, recorded on and read out from said digital storage medium, and decoded along with said multiplexed signal, and said identifier is used to control said demultiplexing step.

17. The method of claim 16, wherein said encoding step comprises encoding said multiplexed signal into an AES/EBU format that is organized into 32-bit subframes, and one of the bits of said subframes is dedicated to said identifier.

18. A system for recording multi-channel digital audio signals having a predetermined data bit rate onto a permanent digital storage medium that is capable of storing digital audio signals which it receives in a predetermined format, and at a data bit rate that does not exceed a predetermined maximum data bit rate, said input digital audio signals having an aggregate data bit rate that exceeds said maximum data bit rate, comprising:
a plurality of data bit rate compressors for compressing the data bit rates of respective input digital audio signal channels so that their aggregate data bit rate after compression does not exceed the storage medium's maximum data bit rate,
a multiplexer connected to multiplex outputs from said data bit rate compressors into a multiplexed signal with a data bit rate that does not exceed the storage medium's maximum data bit rate,
an encoder for encoding an output from said multiplexer into said predetermined format, and
a recorder for recording an output from said encoder onto said digital storage medium.

19. The recording system of claim 18, for a digital storage medium that is configured to store a two-channel stereo recording, wherein said multiplexer produces an output that is equivalent in data bit rate to a two-channel stereo signal suitable for recording on said digital storage medium.

20. The recording system of claim 19, wherein data bit rate compressors for more than two input digital audio signals are provided.

21. The recording system of claim 18, wherein said digital storage medium is configured to store audio sample signals having a predetermined number of bits per sample, and said compressors compress the data bit rates of said input digital audio signals by a factor at least as great as the ratio of the bits per sample for said input digital audio signals to said predetermined number of bits per sample.

22. The recording system of claim 21, wherein said digital storage medium is configured to store a predetermined number of audio channels, and said compressors compress the data bit rates of said input digital audio signals by a factor at least as great as said bits per sample ratio multiplied by the ratio of the number of input signal channels to said predetermined number of audio channels.

23. The recording system of claim 22, wherein said multiplexer multiplexes the outputs from said data bit rate compressors into said multiplexed signal in data groups having said predetermined number of bits.

24. The recording system of claim 18, wherein said multiplexer includes a capability for multiplexing a bit error correction algorithm along with said compressed digital audio signals into an output for said encoder.

25. The recording system of claim 18, further comprising intermediate digital storage media connected to compile respective sets of said digital audio signals after compression by said data bit rate compressors, and to present said compiled sets of signals to said multiplexer.

* * * * *